(12) United States Patent
Watanabe

(10) Patent No.: US 9,726,492 B2
(45) Date of Patent: Aug. 8, 2017

(54) ANGULAR VELOCITY DETECTION ELEMENT

(71) Applicant: Murata Manufacturing Co., Ltd., Nagaokakyo-shi, Kyoto-fu (JP)

(72) Inventor: Kosuke Watanabe, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 298 days.

(21) Appl. No.: 14/724,886

(22) Filed: May 29, 2015

(65) Prior Publication Data

US 2015/0285634 A1    Oct. 8, 2015

Related U.S. Application Data

(63) Continuation of application No. PCT/JP2013/082547, filed on Dec. 4, 2013.

(30) Foreign Application Priority Data

Dec. 11, 2012    (JP) .................................. 2012-270213

(51) Int. Cl.
*G01C 19/5733*    (2012.01)
*G01C 19/574*    (2012.01)
*G01C 19/5642*    (2012.01)

(52) U.S. Cl.
CPC ..... *G01C 19/5733* (2013.01); *G01C 19/5642* (2013.01); *G01C 19/574* (2013.01)

(58) Field of Classification Search
CPC .................................................. G01C 19/5733
See application file for complete search history.

(56) References Cited

U.S. PATENT DOCUMENTS 5,895,852 A * 4/1999 Moriya ............. G01C 19/5719
73/504.12
6,378,369 B1 * 4/2002 Takata ............... G01C 19/5719
73/504.12

(Continued)

FOREIGN PATENT DOCUMENTS

CA    2 279 176 A1    7/1998
EP    0 977 145 A2    2/2000

(Continued)

OTHER PUBLICATIONS

Official Communication issued in International Patent Application No. PCT/JP2013/082547, mailed on Jan. 21, 2014.

*Primary Examiner* — R. A. Smith
*Assistant Examiner* — Herbet K Roberts
(74) *Attorney, Agent, or Firm* — Keating & Bennett, LLP

(57) ABSTRACT

A vibrating body of an angular velocity detection element includes detection beams extending in a cross shape from a central base and external connection beams and internal connection beams connected between adjacent detection beams. The detection beams each include a base end detection beam that is connected to the central base and a central detection beam, a left detection beam and a right detection beam that define three prongs. The central detection beam is connected to the external connection beams on both sides, the left detection beam is connected to the internal connection beam on the left side and the right detection beam is connected to the internal connection beam on the right side. The adjacent external connection beams undergo driven vibration so as to be displaced in directions so as to have mirror relationships with each other with the detection beams interposed between the external connection beams acting as boundaries therebetween.

20 Claims, 16 Drawing Sheets

(56) References Cited

U.S. PATENT DOCUMENTS

| | | | |
|---|---|---|---|
| 6,378,774 B1 | 4/2002 | Emori et al. | |
| 6,450,033 B1* | 9/2002 | Ito | B81B 3/0051 |
| | | | 73/514.29 |
| 6,774,865 B1 | 8/2004 | Serra | |
| 9,315,376 B2* | 4/2016 | Roland | B81B 3/0018 |
| 2006/0012482 A1 | 1/2006 | Zalud et al. | |
| 2006/0272410 A1* | 12/2006 | Mao | G01C 19/5719 |
| | | | 73/504.02 |
| 2009/0079574 A1 | 3/2009 | Oroku et al. | |
| 2010/0236327 A1* | 9/2010 | Mao | G01C 19/5719 |
| | | | 73/504.12 |
| 2011/0094301 A1 | 4/2011 | Rocchi | |
| 2011/0100122 A1 | 5/2011 | Tamura et al. | |
| 2011/0154898 A1* | 6/2011 | Cazzaniga | G01C 19/5747 |
| | | | 73/504.12 |
| 2011/0179869 A1* | 7/2011 | Kobayashi | G01C 19/574 |
| | | | 73/504.12 |
| 2011/0296914 A1* | 12/2011 | Takahashi | G01C 19/5726 |
| | | | 73/504.15 |
| 2011/0303007 A1* | 12/2011 | Rocchi | G01C 19/574 |
| | | | 73/504.09 |
| 2012/0048017 A1* | 3/2012 | Kempe | G01C 19/5747 |
| | | | 73/504.12 |
| 2012/0216613 A1* | 8/2012 | Honda | G01C 19/5747 |
| | | | 73/504.15 |
| 2013/0277775 A1* | 10/2013 | Roland | G01C 19/5747 |
| | | | 257/415 |
| 2014/0077664 A1* | 3/2014 | Ogura | G01C 19/5712 |
| | | | 310/370 |
| 2015/0247726 A1* | 9/2015 | Watanabe | H01L 41/1132 |
| | | | 73/504.12 |
| 2016/0025492 A1* | 1/2016 | Rocchi | G01C 19/574 |
| | | | 73/504.08 |
| 2016/0187135 A1* | 6/2016 | Yasumoto | G01C 19/5607 |
| | | | 73/504.16 |
| 2016/0341551 A1* | 11/2016 | Cook | G01C 19/5733 |
| 2016/0370182 A1* | 12/2016 | Shao | G01C 19/5769 |
| 2017/0052027 A1* | 2/2017 | Jomori | B81B 3/00 |

FOREIGN PATENT DOCUMENTS

| | | |
|---|---|---|
| EP | 1 037 755 A1 | 9/2000 |
| JP | 2001-266100 A | 9/2001 |
| JP | 2008-224628 A | 9/2008 |
| JP | 2010-002385 A | 1/2010 |
| JP | 2010-266276 A | 11/2010 |
| JP | 2011-158319 A | 8/2011 |
| JP | 2011-525976 A | 9/2011 |
| JP | 2012-519269 A | 8/2012 |
| JP | 2012-177610 A | 9/2012 |
| WO | 2011/136969 A1 | 11/2011 |
| WO | 2012/019768 A1 | 2/2012 |

* cited by examiner

ANGULAR VELOCITY DETECTION ELEMENT

BACKGROUND OF THE INVENTION

1. Field of the Invention

The present invention relates to an angular velocity detection element that detects an angular velocity using a Coriolis force. In particular, the present invention relates to an angular velocity detection element that causes a vibrating body to undergo driven vibration in an in-plane direction of a planar surface and detects an angular velocity based on a detection vibration generated in an in-plane direction or an out-of-plane direction by a Coriolis force.

2. Description of the Related Art

First, an example configuration of an angular velocity detection element of the related art will be described. Here, an axis that extends parallel to a direction (thickness direction) orthogonal to a planar surface of an angular velocity detection element including the planar surface is a Z axis of an orthogonal coordinates system. In addition, 2 axes that are parallel to the planar surface and orthogonal to each other are an X axis and a Y axis of the orthogonal coordinates system.

FIG. 16A is an X-Y plane plan view of an angular velocity detection element 201 according to a 1st example of the related art (for example, refer to Japanese Unexamined Patent Application Publication No. 2008-224628).

The angular velocity detection element 201 includes a support portion 202, arm portions 203A, 203B and 203C, piezoelectric functional layers 204A, 204B and 204C, a fixed portion 205 and a cushioning portion 206. The fixed portion 205, the cushioning portion 206, the support portion 202 and the arm portions 203A, 203B and 203C are integrated with one another. A surface of the fixed portion 205 on the negative direction side of the Z axis is joined to a support substrate, which is not illustrated. In addition, terminal electrodes electrically connected to the piezoelectric functional layers 204A, 204B and 204C, which will be described later, are provided on a surface of the fixed portion 205 on the positive direction side of the Z axis. The cushioning portion 206 extends in a positive Y axis direction from the fixed portion 205. A width of the cushioning portion 206 in an X axis direction is smaller than widths of the support portion 202 and the fixed portion 205. The support portion 202 extends in the positive Y axis direction from the cushioning portion 206. The arm portions 203A, 203B and 203C extend in the positive Y axis direction parallel to each other from the support portion 202. The cushioning portion 206, the support portion 202 and the arm portions 203A, 203B and 203C are supported by the fixed portion 205 as to float above the support substrate. The piezoelectric functional layers 204A, 204B and 204C are respectively provided on surfaces of the arm portions 203A, 203B and 203C on the positive direction side of the Z axis. The piezoelectric functional layers 204A and 204C have a function of exciting a driven vibration in the arm portions 203A, 203B and 203C. Specifically, the piezoelectric functional layers 204A and 204C expand and contract as a result of being input with a driving signal. The piezoelectric functional layers 204A and 204C expand and contract and as a result, the arm portions 203A and 203C undergo driven vibrations so as to bend in a Z axis direction. Driven vibrations are excited with the same phase in the arm portion 203A and the arm portion 203C. Thus, the arm portion 203B undergoes coupled vibration with the driven vibrations of the arm portions 203A and 203C and undergoes the same driven vibration along the Z axis. The driven vibration of the arm portion 203B and the driven vibrations of the arm portions 203A and 203C are excited with opposite phases. The piezoelectric functional layer 204B has a function of detecting a detection vibration of the arm portion 203B. In a state where the arm portion 203B is undergoing driven vibration, when an angular velocity acts around the Y axis, Coriolis forces are generated in the arm portions 203A, 203B and 203C and the arm portions 203A, 203B and 203C undergo detection vibration so as to bend in an X axis direction. The detection vibration of the arm portion 203B is detected via a piezoelectric effect of the piezoelectric functional layer 204B.

FIG. 16B is a perspective view of an angular velocity detection element 251 according to a 2nd example of the related art (for example, refer to Japanese Unexamined Patent Application Publication No. 2011-158319).

The angular velocity detection element 251 includes a base 252, detection beams 253A to 253D and a frame 256. The base 252 is positioned at the center of a planar surface of the angular velocity detection element 251. The detection beams 253A to 253D extend from the base 252 in a cross shape. One end of each of the detection beams 253A to 253D is connected to the base 252. The other end of each of the detection beams 253A to 253D is connected to the frame 256. The frame 256 has a substantially square shape when viewed in plan and is formed of corners 254A to 254D, which are positioned at the vertices of the substantially square shape, and driven beams 255A to 255D, which connect the corners 254A to 254D to each other. Masses 257A to 257D are attached to each of the driven beams 255A to 255D. The masses 257A to 257D are each formed of a pair of supplementary masses provided so as to sandwich the respective driven beams 255A to 255D therebetween. The pairs of supplementary masses forming the masses 257A to 257D are connected to the centers of the driven beams 255A to 255D.

Driving piezoelectric elements 260 to 263 are provided on surfaces of the driven beams 255A to 255D. The driving piezoelectric elements 260 to 263 are each formed of a pair of piezoelectric elements. The pair of piezoelectric elements forming each of the driving piezoelectric elements 260 to 263 are arranged parallel to each other along the directions in which the driven beams 255A to 255D extend. The driving piezoelectric elements 260 to 263 are applied with a driving voltage and as a result expand and contract. The driven beams 255A to 255D are driven by the driving piezoelectric elements 260 to 263 and undergo driven vibration so as to be alternately displaced in a direction toward the base 252 and in a direction away from the base 252 in the X-Y plane. The driven vibrations of the driven beams 255A to 255D are excited with the same phase.

Detection piezoelectric elements 264 to 267 are provided on surfaces of the detection beams 253A to 253D. The detection piezoelectric elements 264 to 267 are each formed of a pair of piezoelectric elements. The pair of piezoelectric elements forming each of the detection piezoelectric elements 264 to 267 are arranged parallel to each other along the directions in which the detection beams 253A to 253D extend. When an angular velocity acts on the angular velocity detection element 251, the detection beams 253A to 253D undergo detection vibration due to generated Coriolis forces. The detection piezoelectric elements 264 to 267 detect the detection vibrations of the detection beams 253A to 253D. More specifically, when an angular velocity acts on the angular velocity detection element 251 around a Z axis direction in a state where the driven beams 255A to 255D are undergoing driven vibration, Coriolis forces are generated in the masses 257A to 257D in a direction orthogonal to the direction in which the angular velocity is acting and orthogonal to the direction of the driven vibration. That is, Coriolis forces are generated in directions parallel to the directions in which the driven beams 255A to 255D extend in a state of rest. The masses 257A to 257D are displaced (undergo detection vibration) by the Coriolis forces. The detection vibrations of the masses 257A to 257D are transmitted to the detection beams 253A to 253D via the driven beams 255A to 255D and the corners 254A to 254D and the detection beams 253A to 253D are made to undergo detection vibration. The detection vibrations of the detection beams 253A to 253D are detected by the detection piezoelectric elements 264 to 267.

The above-described angular velocity detection element 201 is only able to detect an angular velocity around 1 axis and a plurality of the angular velocity detection elements 201 would have to be arranged along axes for which detection is desired in order to detect angular velocities around a plurality of axes. Consequently, there is a problem in that increases in package size and cost are incurred. In addition, since the arm portion 203B, on which the piezoelectric functional layer 204B to detect a detection vibration is provided, undergoes driven vibration in opposite directions along the Z axis to the arm portions 203A and 203C on either side, the piezoelectric functional layer 204B outputs a signal due to driven vibration even in a state where there is no angular velocity is acting. This signal could be removed by a circuit in a later stage but this would cause the detection sensitivity and detection accuracy of the angular velocity to be reduced.

Furthermore, the above-described angular velocity detection element 251 undergoes detection vibration such that all the masses rotate in the same direction around the Z axis when an angular velocity acts around the Z axis. Consequently, when an angular velocity acts around the Z axis, vibration of the weights acts as torque on the central base. Not limited to the case of an angular velocity around the Z axis, vibration of the weights similarly acts as torque on the central base in an out-of-plane direction when an angular velocity acts around the X axis or an angular velocity acts around the Y axis. That is, in the angular velocity detection element 251, there is a problem in that detection vibrations are not confined within the structure and escape and the detection beams are not able to be deform effectively and as a result the detection sensitivity is reduced. Furthermore, conversely, there is also a problem in that the above-mentioned detection vibrations may be generated by the effect of stress or vibration acting on the external structure and variations in characteristics may be caused by changes in temperature or changes in substrate stress, resulting in the detection accuracy being reduced.

SUMMARY OF THE INVENTION

Accordingly, preferred embodiments of the present invention provide an angular velocity detection element that is capable of detecting angular velocities around all axes of an orthogonal coordinates system without incurring increases in package size and cost, is capable of preventing generation of a detection signal by a driven vibration, and is capable of realizing high detection sensitivity and detection accuracy by confining driven vibrations and detection vibrations to inside a vibrating body.

An angular velocity detection element according to a preferred embodiment of the present invention detects an angular velocity based on a detection vibration generated by an action of a Coriolis force in a vibrating body that undergoes driven vibration along a planar surface. The vibrating body includes a central base, four detection beams, four internal connection beams and four external connection beams. The central base is fixed in the center of the planar surface. The four detection beams extend in radial directions from the central base at equal angular intervals at the planar surface. The four internal connection beams are connected between the four adjacent detection beams and have weights attached thereto. The four external connection beams are connected between the four adjacent detection beams and have weights attached thereto. In addition, the external connection beams are arranged farther toward the outside in the radial directions than the internal connection beams. Each of the four detection beams includes a base end detection beam, a central detection beam, a 1st-direction-side detection beam and a 2nd-direction-side detection beam. The base end detection beam is connected to the central base at an end portion of the base end detection beam on the inside in the radial direction. The central detection beam is connected to the base end detection beam at an end portion of central detection beam on the inside in the radial direction and is connected at an end portion of the central detection beam on the outside in the radial direction to the external connection beam adjacent thereto in a 1st direction and to the external connection beam adjacent thereto in a 2nd direction. The 1st direction is a direction that is orthogonal to the radial direction in the planar surface. The 2nd direction is a direction opposite to the 1st direction. The 1st-direction-side detection beam is connected to the base end detection beam at an end portion of the 1st-direction-side detection beam on the inside in the radial direction and is connected to the internal connection beam adjacent thereto in the 1st direction at an end portion of the 1st-direction-side detection beam on the outside in the radial direction. The 2nd-direction-side detection beam is connected to the base end detection beam at an end portion of the 2nd-direction-side detection beam on the inside in the radial direction and is connected to the internal connection beam adjacent thereto in the 2nd direction at an end portion of the 2nd-direction-side detection beam on the outside in the radial direction. In a driven vibration of the vibrating body, one out of the four external connection beams and the four internal connection beams is displaced in a direction such that each pair of weights adjacent to each other with a detection beam therebetween have a mirror image relationship with each other with the detection beam acting as a boundary therebetween at the planar surface, and the other out of the four external connection beams and the four internal connection beams is static.

With this configuration, detection vibrations caused by angular velocities around three axes of an orthogonal coordinates system are separately detected. In addition, driven vibrations of the external connection beams and the internal connection beams are transmitted from both sides of the detection beams and balance each other out and as a result deformation of the central detection beams and the base end detection beams of the detection beams in the 1st direction and the 2nd direction by the driven vibrations is significantly reduced or prevented. Therefore, the driven vibrations are prevented from being transmitted to the external connection beams and the internal connection beams via the central detection beams and the driven vibrations are prevented from being transmitted to the central base via the base end detection beams and detection sensitivity is improved. In addition, a driven vibration is not generated due to the effect of vibration or deformation of an external structure and detection accuracy is improved. Therefore, detection sensitivity and detection accuracy of angular velocity are improved. Furthermore, variations in characteristics caused by changes in stress acting on an external structure or by changes in temperature are significantly reduced or prevented.

In the above-described angular velocity detection element, as for the one out of the four external connection beams and the four internal connection beams that undergoes driven vibration, the weights thereof may be displaced with the same phase in the radial direction and each pair of weights thereof adjacent to each other with a detection beam therebetween may rotate in opposite directions to each other around an axis orthogonal to the planar surface.

With either of these configurations, each pair of weights adjacent to each other with a detection beam therebetween is caused to be displaced in a direction such that the weights have a mirror image relationship with each other with the detection beam acting as a boundary therebetween at the planar surface.

In the above-described angular velocity detection element, it is preferable that the one out of the four external connection beams and the four internal connection beams that undergoes driven vibration each include 1st connection beams that extend in a direction intersecting the radial direction at the planar surface and are connected to the detection beam and a weight that is connected between the 1st connection beams, and that the detection vibration of the vibrating body be detected based on a vibration of the other of the four external connection beams and the four internal connection beams that is static in the driven vibration.

With this configuration, a displacement is generated due to a detection vibration in the external connection beams or the internal connection beams that are static in the driven vibration and this displacement is detected, such that only the displacement due to the detection vibration is detected without the effect of the driven vibration and the detection sensitivity and detection accuracy of angular velocity are improved.

In the above-described angular velocity detection element, it is preferable that the detection vibration of the vibrating body be detected such that the external connection beams and the internal connection beams are displaced in directions orthogonal to the planar surface in opposite directions to each other.

With this configuration, an angular velocity around an axis parallel to the planar surface (X axis or Y axis) is detected separately for each axis around which an angular velocity acts. The detection vibration caused by this angular velocity is transmitted from the external connection beam and the internal connection beam to the detection beam as vibrations in opposite directions and these vibrations cancel each other out in the base end detection beam.

In the above-described angular velocity detection element, it is preferable that the detection vibration of the vibrating body be detected such that the external connection beams and the internal connection beams rotate in opposite directions to each other around an axis orthogonal to the planar surface.

With this configuration, an angular velocity around an axis orthogonal to the planar surface (Z axis) is detected separately from angular velocities around axes parallel to the planar surface (X axis and Y axis). The detection vibration caused by this angular velocity is transmitted from the external connection beam and the internal connection beam to the detection beam as vibrations in opposite directions and these vibrations cancel each other out in the base end detection beam.

In the above-described angular velocity detection element, it is preferable that one out of the four external connection beams and the four internal connection beams that undergoes driven vibration each include 1st connection beams that extend in a direction intersecting the radial direction at the planar surface and are connected to the detection beam, 2nd connection beams that extend in the radial direction at the planar surface and are connected to the 1st connection beams and a weight that is connected between the 2nd connection beams, and that the other out of the four external connection beams and the four internal connection beams that is static in the driven vibration is static in the detection vibration of the vibrating body.

With this configuration, the external connection beams or the internal connection beams that are static in the driven vibration remain static in the detection vibration as well. That is, the driven vibration and the detection vibration are confined in only the external connection beams or the internal connection beams. Therefore, designing of the other of the external connection beams and the internal connection beams that is static in the driven vibration and the detection vibration becomes simple.

It is preferable that the above-described angular velocity detection element further include a driving piezoelectric element that causes the vibrating body to undergo driven vibration and a detection piezoelectric element that detects a detection vibration of the vibrating body.

With this configuration, the driving element and the detection element preferably include piezoelectric elements and therefore the angular velocity detection element is reduced in size.

The above-described angular velocity detection element preferably further includes a monitor piezoelectric element that detects a driven vibration of the vibrating body in order to control a driving voltage of the driving piezoelectric element.

With this configuration, a signal corresponding to the driven vibration is detected using the monitor piezoelectric element and the driving voltage is subjected to feedback control using this signal and thus a stable driven vibration is realized. Therefore, the precision of detection sensitivity is improved. In addition, since a piezoelectric element is used, the angular velocity detection element is reduced in size.

In the above-described angular velocity detection element, it is preferable that the vibrating body includes a single substrate.

With this configuration, a plurality of angular velocity detection elements is able to be efficiently manufactured by performing surface processing in a wafer state.

In the above-described angular velocity detection element, it is preferable that the substrate is a semiconductor wafer.

With this configuration, the technology for profiling and the performance of manufacturing apparatuses are mature and therefore manufacturing is simple.

With various preferred embodiments of the present invention, angular velocities around three axes of an orthogonal coordinates system are separately detected. In addition, it is possible to detect only detection vibrations without detecting driven vibrations by causing the vibrating body to undergo driven vibration such that one out of external connection beams and internal connection beams vibrates and the other out of the external connection beams and the internal connection beams is static. Furthermore, driven vibrations transmitted via the central detection beams and base end detection beams are greatly reduced and therefore the detection sensitivity of angular velocity is improved. In addition, a driven vibration is not generated due to the central base being affected by an external structure and therefore detection accuracy is improved. Furthermore, variations in characteristics caused by changes in stress acting on an external structure or by changes in temperature are significantly reduced or prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

In the following description, 2 axes that are parallel to a planar surface of a vibrating body and are orthogonal to each other are an X axis and a Y axis of an orthogonal coordinates system. In addition, an axis that is orthogonal to the planar surface of the vibrating body is a Z axis of the orthogonal coordinates system.

Furthermore, in the following description, a direction that is orthogonal to a radial direction from the center in the planar surface of the vibrating body and that rotates anti-clockwise from the radial direction is a 1st direction. A direction that is orthogonal to the radial direction and rotates clockwise from the radial direction is a 2nd direction. The 1st direction may be called a left direction, the 2nd direction may be called a right direction, a 1st direction side may be called a left side and a 2nd direction side may be called a right side as the description progresses.

Figure 1A:
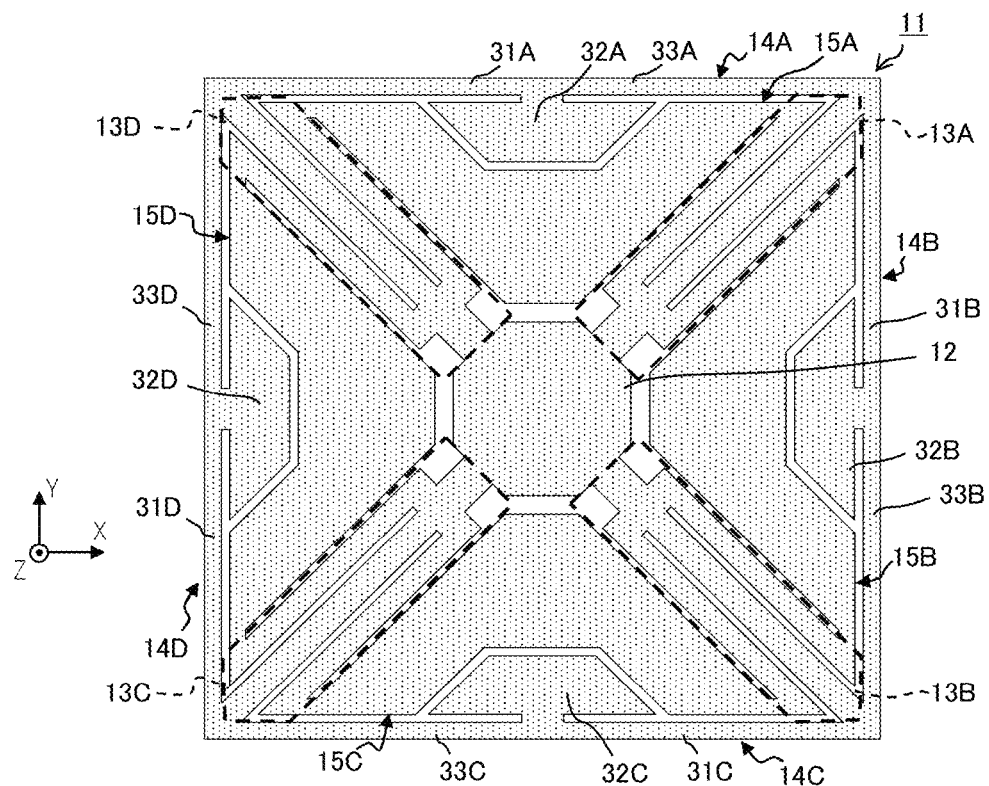
FIGS. 1A and 1B illustrate a vibrating body of an angular velocity detection element according to a 1st preferred embodiment of the present invention.

FIG. 1A is an X-Y plane plan view illustrating a vibrating body 11 of an angular velocity detection element 10 according to a 1st preferred embodiment of the present invention.

The vibrating body 11 is supported by a support substrate, which is not illustrated. The support substrate preferably is formed of, for example a ceramic, a resin, silicon or a glass material and has a planar surface that is parallel to a planar surface of the vibrating body 11.

The vibrating body 11 includes a planar surface that is parallel to the X axis and the Y axis on the positive direction side of the Z axis and on the negative direction side of the Z axis. The vibrating body 11 is manufactured by subjecting a semiconductor silicon wafer to etching processing to form openings that penetrate therethrough in a thickness direction parallel to the Z axis, and then cutting out a plurality of vibrating bodies 11 from the semiconductor silicon wafer.

The vibrating body 11 preferably has a 4-fold rotationally symmetrical shape when looking at the planar surface. The vibrating body 11 includes a central base 12, detection beams 13A, 13B, 13C and 13D, external connection beams 14A, 14B, 14C and 14D and internal connection beams 15A, 15B, 15C and 15D.

The central base 12 is positioned at the center of the vibrating body 11 when looking at the planar surface. At least one of a surface of the central base 12 on the positive direction side of the Z axis and a surface of the central base 12 on the negative direction side of the Z axis is fixed to an external structure via a support substrate, which is not illustrated. The central base 12 supports the detection beams 13A to 13D, the external connection beams 14A to 14D and the internal connection beams 15A to 15D in a state of floating above the support substrate.

More specifically, the central base 12 has an octagonal shape composed of a side facing in a direction of a clockwise angle of 0° using the positive Y axis direction as a reference (angles described hereafter are similarly defined), a side facing in a 45° direction, a side facing in a 90° direction, a side facing in a 135° direction, a side facing in a 180° direction, a side orthogonal to a 225° direction, a side facing in a 270° direction and a side facing in a 315° direction within the planar surface.

The detection beams 13A to 13D are provided in a cross shape with respect to the central base 12 when looking at the planar surface. That is, the detection beams 13A to 13D extend in radial directions at equal angular intervals at the planar surface. Surfaces of the detection beams 13A to 13D on the positive Z axis direction side or the negative Z axis direction side oppose the planar surface of the support substrate with a gap therebetween.

More specifically, the detection beam 13A is connected near the center of the side of the central base 12 facing in the 45° direction and extends in a radial direction from the connection position with the central base 12, that is, extends in the 45° direction. The detection beam 13B is connected near the center of the side of the central base 12 facing in the 135° direction and extends in a radial direction from the connection position with the central base 12, that is, extends in the 135° direction. The detection beam 13C is connected near the center of the side of the central base 12 facing in the 225° direction and extends in a radial direction from the connection position with the central base 12, that is, extends in the 225° direction. The detection beam 13D is connected near the center of the side of the central base 12 facing in the 315° direction and extends in a radial direction from the connection position with the central base 12, that is, extends in the 315° direction.

The external connection beams 14A to 14D are connected between adjacent detection beams 13A to 13D. Surfaces of the external connection beams 14A to 14D on the positive Z axis direction side or the negative Z axis direction side oppose the planar surface of the support substrate with a gap therebetween. In addition, the external connection beams 14A to 14D are connected to each other so as to form a rectangular frame shape when looking at the planar surface. The detection beams 13A to 13D are connected to the corresponding four inner corners in the radial directions of the rectangular frame formed by the external connection beams 14A to 14D.

More specifically, the external connection beam 14A is arranged in a 0° direction with respect to the central base 12 when looking at the planar surface and includes a connection beam 31A, a weight 32A and a connection beam 33A. The connection beam 31A extends along the X axis, is connected to the external connection beam 14D and the detection beam 13D at an end portion thereof on the negative X axis direction side and is connected to the weight 32A at an end portion thereof on the positive X axis direction side. The connection beam 33A extends along the X axis, is connected to the external connection beam 14B and the detection beam 13A at an end portion thereof on the positive X axis direction side and is connected to the weight 32A at an end portion thereof on the negative X axis direction side. The weight 32A is connected between the connection beam 31A and the connection beam 33A and is arranged on the inside of the connection beam 31A and the connection beam 33A in the radial direction.

The external connection beam 14B is arranged in a 90° direction with respect to the central base 12 when looking at the planar surface and includes a connection beam 31B, a weight 32B and a connection beam 33B. The connection beam 31B extends along the Y axis, is connected to the external connection beam 14A and the detection beam 13A at an end portion thereof on the positive Y axis direction side and is connected to the weight 32B at an end portion thereof on the negative Y axis direction side. The connection beam 33B extends along the Y axis, is connected to the external connection beam 14C and the detection beam 13B at an end portion thereof on the negative Y axis direction side and is connected to the weight 32B at an end portion thereof on the positive Y axis direction side. The weight 32B is connected between the connection beam 31B and the connection beam 33B and is arranged on the inside of the connection beam 31B and the connection beam 33B in the radial direction.

The external connection beam 14C is arranged in a 180° direction with respect to the central base 12 when looking at the planar surface and includes a connection beam 31C, a weight 32C and a connection beam 33C. The connection beam 31C extends along the X axis, is connected to the external connection beam 14B and the detection beam 13B at an end portion thereof on the positive X axis direction side and is connected to the weight 32C at an end portion thereof on the negative X axis direction side. The connection beam 33C extends along the X axis, is connected to the external connection beam 14D and the detection beam 13C at an end portion thereof on the negative X axis direction side and is connected to the weight 32C at an end portion thereof on the positive X axis direction side. The weight 32C is connected between the connection beam 31C and the connection beam 33C and is arranged on the inside of the connection beam 31C and the connection beam 33C in the radial direction.

The external connection beam 14D is arranged in a 270° direction with respect to the central base 12 when looking at the planar surface and includes a connection beam 31D, a weight 32D and a connection beam 33D. The connection beam 31D extends along the Y axis, is connected to the external connection beam 14C and the detection beam 13C at an end portion thereof on the negative Y axis direction side and is connected to the weight 32D at an end portion thereof on the positive Y axis direction side. The connection beam 33D extends along the Y axis, is connected to the external connection beam 14A and the detection beam 13D at an end portion thereof on the positive Y axis direction side and is connected to the weight 32D at an end portion thereof on the negative Y axis direction side. The weight 32D is connected between the connection beam 31D and the connection beam 33D and is arranged on the inside of the connection beam 31D and the connection beam 33D in the radial direction.

The internal connection beams 15A to 15D are connected between adjacent detection beams 13A to 13D and are provided on the inside of the external connection beams 14A to 14D in the radial directions. Surfaces of the internal connection beams 15A to 15D on the positive Z axis direction side or the negative Z axis direction side oppose the planar surface of the support substrate with a gap therebetween.

Specifically, the internal connection beam 15A is arranged at a 0° direction with respect to the central base 12 when looking at the planar surface, extends roughly along the X axis, is connected to the detection beam 13A at an end portion thereof on the positive X axis direction side and is connected to the detection beam 13D at an end portion thereof on negative X axis direction side. The internal connection beam 15A is configured to occupy the majority of a region enclosed by the detection beam 13A, the detection beam 13D and the external connection beam 14A when looking at the planar surface and functions as both a weight and a connection beam.

The internal connection beam 15B is arranged at a 90° direction with respect to the central base 12 when looking at the planar surface, extends roughly along the Y axis, is connected to the detection beam 13B at an end portion thereof on the negative Y axis direction side and is connected to the detection beam 13A at an end portion thereof on the positive Y axis direction side. The internal connection beam 15B is configured so as to occupy the majority of a region enclosed by the detection beam 13A, the detection beam 13B and the external connection beam 14B when looking at the planar surface and functions as both a weight and a connection beam.

The internal connection beam 15C is arranged at a 180° direction with respect to the central base 12 when looking at the planar surface, extends roughly along the X axis, is connected to the detection beam 13C at an end portion thereof on the negative X axis direction side and is connected to the detection beam 13B at an end portion thereof on the positive X axis direction side. The internal connection beam 15C is configured so as to occupy the majority of a region enclosed by the detection beam 13B, the detection beam 13C and the external connection beam 14C when looking at the planar surface and functions as both a weight and a connection beam.

The internal connection beam 15D is arranged at a 270° direction with respect to the central base 12 when looking at the planar surface, extends roughly along the Y axis, is connected to the detection beam 13D at an end portion thereof on the positive Y axis direction side and is connected to the detection beam 13C at an end portion thereof on the negative Y axis direction side. The internal connection beam 15D is configured so as to occupy the majority of a region enclosed by the detection beam 13C, the detection beam 13D and the external connection beam 14D when looking at the planar surface and functions as both a weight and a connection beam.

Figure 1B:
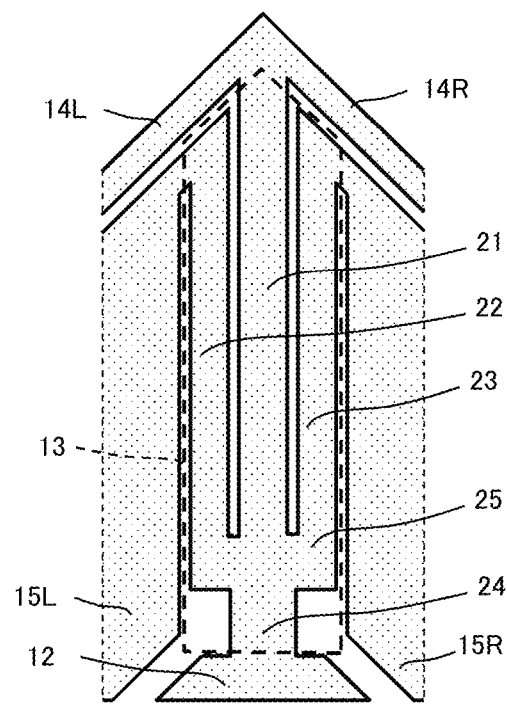

FIG. 1B is an X-Y plane plan view illustrating the structure in the vicinity of the detection beams 13A to 13D. In FIG. 1B, the reference numerals of the detection beams 13A to 13D have been changed to that of a detection beam 13. In addition, reference numerals of external connection beams 14A to 14D have been changed to that of an external connection beam 14L for one positioned to the left of the detection beam 13 and to that of an external connection beam 14R for one positioned to the right of the detection beam 13. In addition, reference numerals of internal connection beams 15A to 15D have been changed to that of an internal connection beam 15L for one positioned to the left of the detection beam 13 and to that of an internal connection beam 15R for one positioned to the right of the detection beam 13.

The detection beam 13 includes a central detection beam 21, a left detection beam 22, a right detection beam 23, a base end detection beam 24 and a connection portion 25. The central detection beam 21, the left detection beam 22, the right detection beam 23 and the base end detection beam 24 are connected to each other at the connection portion 25. The base end detection beam 24 extends in the radial direction, is connected to the central base 12 at an end portion thereof on the inside in the radial direction and is connected to the central detection beam 21, the left detection beam 22 and the right detection beam 23 via the connection portion 25 at an end portion thereof on the outside in the radial direction. The central detection beam 21 extends in the radial direction of the detection beam 13, is connected to the base end detection beam 24 via the connection portion 25 at an end portion thereof on the inside in the radial direction and is connected to the external connection beam 14L and the external connection beam 14R at an end portion thereof on the outside in the radial direction. The left detection beam 22 extends in the radial direction of the detection beam 13 adjacent to the left side of the central detection beam 21, is connected to the base end detection beam 24 via the connection portion 25 at an end portion thereof on the inside in the radial direction and is connected to the internal connection beam 15L at an end portion thereof on the outside in the radial direction. The right detection beam 23 extends in the radial direction of the detection beam 13 adjacent to the right side of the central detection beam 21, is connected to the base end detection beam 24 via the connection portion 25 at an end portion thereof on the inside in the radial direction and is connected to the internal connection beam 15R at an end portion thereof on the outside in the radial direction.

Regarding the shape of the base end detection beam 24, it is preferable that the width of the base end detection beam 24 in a direction orthogonal to the radial direction be smaller than the width of the connection portion 25 in a direction orthogonal to the radial direction, but the width may instead be the same as the width of the connection portion 25 or the width may be larger than the width of the connection portion 25. The smaller the width of the base end detection beam 24, the more difficult it is for the effect of acceleration and so on acting on the support substrate (external structure) to be transmitted to the detection beam 13 via the central base 12, which is preferable.

The thus-configured vibrating body 11 has a driven vibration mode, a 1st detection vibration mode, a 2nd detection vibration mode and a 3rd detection vibration mode as vibration modes.

Figure 2A:
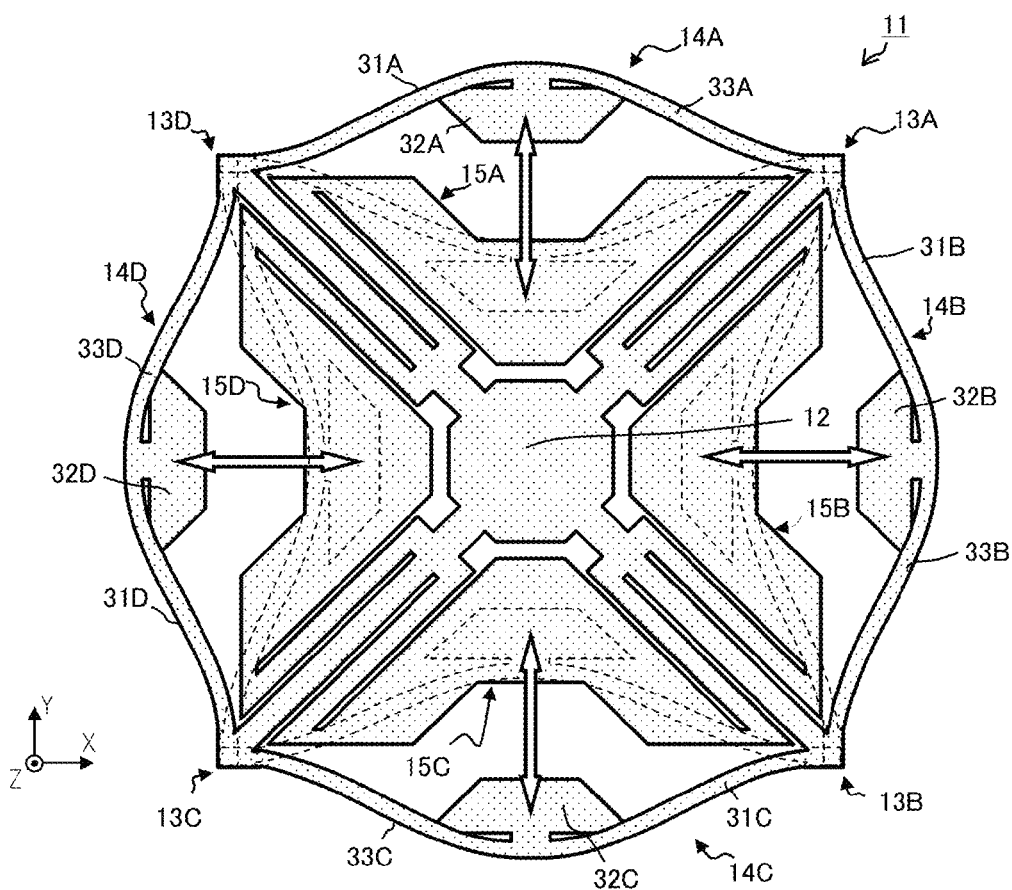
FIGS. 2A and 2B illustrate a driven vibration mode of the vibrating body according to the 1st preferred embodiment of the present invention.
Figure 2B:
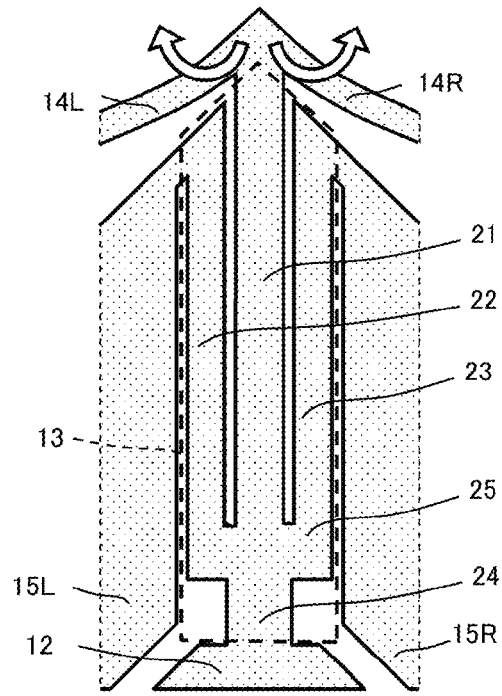

FIG. 2A is an XY plane plan view illustrating a deformation state in the driven vibration mode of the vibrating body 11. FIG. 2B is an X-Y plane plan view illustrating a deformation state in the driven vibration mode in the structure in the vicinity of the detection beams 13A to 13D. In the figures described hereafter, the amount of deformation of each portion is illustrated as being larger than it is in reality.

The driven vibration mode is excited by driving elements, which will be described later, in the angular velocity detection element 10. In the driven vibration mode, the external connection beams 14A to 14D undergo driven vibration in the same direction as each other within the planar surface so as to alternately bend toward the inside and the outside in the radial direction. That is, the weights 32A to 32D, which are adjacent to each other with detection beams 13A to 13D therebetween, are displaced in directions so as to have mirror image relationships with each other with the detection beams 13A to 13D acting as boundaries therebetween at the planar surface. At this time, in the vicinities of the detection beams 13A to 13D, as illustrated in FIG. 2B, deformation occurs such that a state in which the connection angle between the connected external connection beam 14L and external connection beam 14R widens and a state in which the connection angle between the connected external connection beam 14L and external connection beam 14R narrows alternately and periodically repeatedly occur at the end portion of the central detection beam 21 on the outside in the radial direction. Therefore, forces of approximately the same size are symmetrically applied in opposite directions from the external connection beam 14L and the external connection beam 14R to the end portion of the central detection beam 21 on the outside in the radial direction.

Consequently, in the end portion of the central detection beam 21 on the outside in the radial direction, the force applied from the external connection beam 14L and the force applied from the external connection beam 14R balance each other out and a deformation that would cause the central detection beam 21 to bend within the planar surface is not generated. Thus, the driven vibration is not transmitted to the base end detection beam 24, the left detection beam 22 and the right detection beam 23 connected to the end portion of the central detection beam 21 on the inside in the radial direction. That is, the central detection beam 21, the base end detection beam 24, the left detection beam 22, the right detection beam 23, the central base 12 and the internal connection beams 15A to 15D remain static and the energy of the driven vibration does not escape from the central base 12. In addition, even if the support substrate (external structure) to which the central base is fixed deforms or vibrates as a result of receiving a stress, a vibration of the driven vibration mode is not generated in the vibrating body 11 due to the effect of such a deformation or vibration. Therefore, detection sensitivity and detection accuracy are improved. In addition, generation of variations in characteristics is significantly reduced or prevented.

Furthermore, in the driven vibration mode, since only the external connection beams 14A to 14D vibrate and the internal connection beams 15A to 15D and the detection beams 13A to 13D are static, just detection vibrations are detected without detecting driven vibrations by detecting vibrations of the internal connection beams 15A to 15D and the detection beams 13A to 13D with the detection elements, which will be described later. In this way, detection sensitivity and detection accuracy are further improved.

Figure 3:
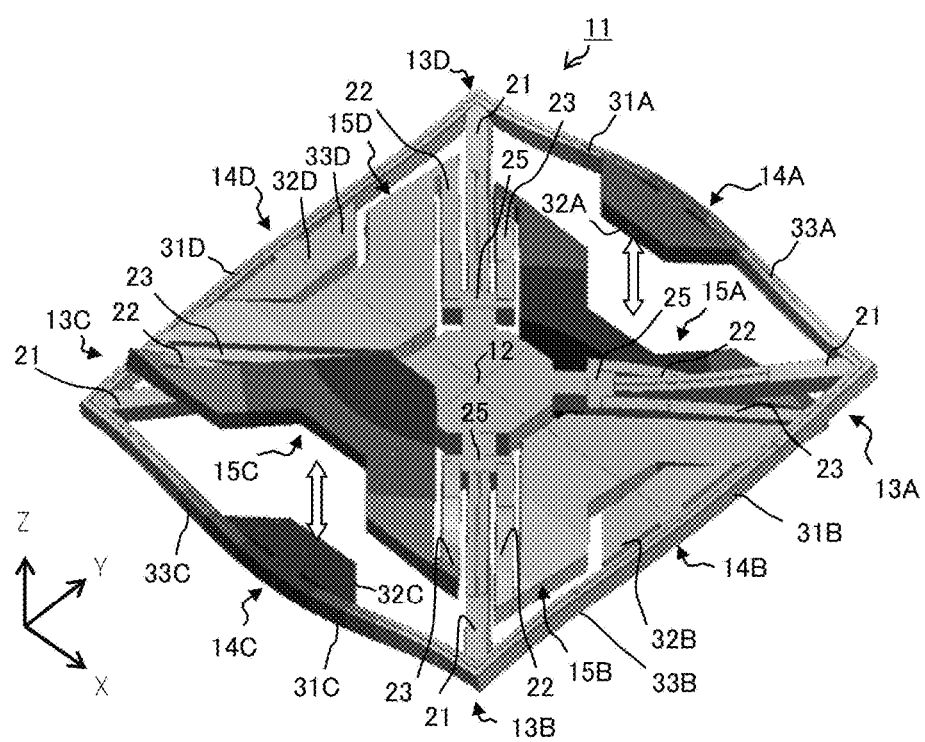
FIG. 3 illustrates a detection vibration mode when an angular velocity is acting around an X axis in the vibrating body according to the 1st preferred embodiment of the present invention.

FIG. 3 is an XY plane plan view illustrating a deformation state in the 1st detection vibration mode of the vibrating body 11.

The 1st detection vibration mode is excited by an angular velocity around the X axis in the angular velocity detection element 10 and is detected from the vibrating body 11 by using detection elements, which will be described later.

An angular velocity around the X axis parallel to the planar surface acts on the vibrating body 11 vibrating in the driven vibration mode and as a result Coriolis forces along the Z axis orthogonal to the axis around which the angular velocity acts and to the direction of the driven vibration are generated in the weights 32A and 32C, which are undergoing driven vibration in a direction orthogonal to the axis around which the angular velocity acts. A vibration of the 1st detection vibration mode is excited in the vibrating body 11 by the Coriolis forces.

The directions of driven vibration of the weights 32A and 32C, which oppose each other, are opposite to each other and therefore the directions in which the Coriolis forces act are opposite to each other. Thus, in the 1st detection vibration mode, the weights 32A and 32C are displaced in opposite directions along the Z axis. At this time, a Coriolis force along the Z axis and a displacement along the Z axis are not generated for the weights 32B and 32D, which are undergoing driven vibration in a direction parallel to the axis around which the angular velocity acts.

Therefore, the external connection beams 14A and 14C to which the weights 32A and 32C are attached undergo detection vibration so as to bend in opposite directions to each other along the Z axis. Thus, vibration in the 1st detection vibration mode does not cause displacement such that the weights 32A to 32D have mirror image relationships to each other as in the above-described driven vibration mode (instead, they have non-mirror-image relationships) and therefore the detection vibrations of the external connection beams 14A and 14C are transmitted to the central detection beams 21 of the detection beams 13D and 13A and to the central detection beams 21 of the detection beams 13B and 13C. Thus, the central detection beams 21 of the detection beams 13D and 13A and the central detection beams 21 of the detection beams 13B and 13C undergo detection vibration so as to bend in opposite directions to each other along the Z axis.

The right detection beam 23 of the detection beam 13D, the internal connection beam 15A and the left detection beam 22 of the detection beam 13A are connected between the central detection beams 21 of the detection beams 13D and 13A. That is, the right detection beam 23 of the detection beam 13D, the internal connection beam 15A and the left detection beam 22 of the detection beam 13A undergo coupled vibration with the detection vibrations of the central detection beams 21 of the detection beams 13D and 13A and the external connection beam 14A. That is, the right detection beam 23 of the detection beam 13D, the internal connection beam 15A and the left detection beam 22 of the detection beam 13A undergo detection vibration in the opposite direction to the central detection beams 21 of the detection beams 13D and 13A and the external connection beam 14A along the Z axis.

The right detection beam 23 of the detection beam 13B, the internal connection beam 15C and the left detection beam 22 of the detection beam 13C are connected between the central detection beams 21 of the detection beams 13B and 13C. The right detection beam 23 of the detection beam 13B, the internal connection beam 15C and the left detection beam 22 of the detection beam 13C undergo coupled vibration with the detection vibrations of the central detection beams 21 of the detection beams 13B and 13C and the external connection beam 14C. That is, the right detection beam 23 of the detection beam 13B, the internal connection beam 15C and the left detection beam 22 of the detection beam 13C undergo detection vibration in the opposite direction to the central detection beams 21 of the detection beams 13C and 13B and the external connection beam 14C along the Z axis.

Therefore, the right detection beam 23 of the detection beam 13D, the internal connection beam 15A and the left detection beam 22 of the detection beam 13A undergo detection vibration in the opposite direction to the right detection beam 23 of the detection beam 13B, the internal connection beam 15C and the left detection beam 22 of the detection beam 13C along the Z axis.

Thus, in the 1st detection vibration mode, the external connection beam 14A and the internal connection beam 15A undergo detection vibration in opposite directions to each other along the Z axis, and the external connection beam 14C and the internal connection beam 15C undergo detection vibration in opposite directions to each other along the Z axis. Therefore, not only the external connection beams 14A and 14C, which vibrate in the driven vibration mode, but also the internal connection beams 15A and 15C, which are static in the driven vibration mode, undergo detection vibration and vibrations of the internal connection beams 15A and 15C are detected by detection elements, which will be described later, and thus it is possible to detect only the detection vibrations without detecting the driven vibrations.

In addition, detection vibrations in the Z axis directions transmitted from the external connection beams 14A and 14C and detection vibrations in the Z axis directions transmitted from the internal connection beams 15A and 15C are transmitted with opposite phases and therefore cancel each other out in the detection beams 13A to 13D. Thus, detection vibrations transmitted to the central base 12 from the connection portions 25 via the base end detection beams 24 are greatly reduced and the energy of detection vibrations does not escape from the central base 12. In addition, even if the support substrate (external structure) to which the central base is fixed deforms or vibrates as a result of receiving a stress, a vibration of the 1st detection vibration mode is not generated in the vibrating body 11 due to the effect of such a deformation or vibration. Therefore, the detection sensitivity and detection accuracy are further improved and generation of variations in characteristics is significantly reduced or prevented.

Figure 4:
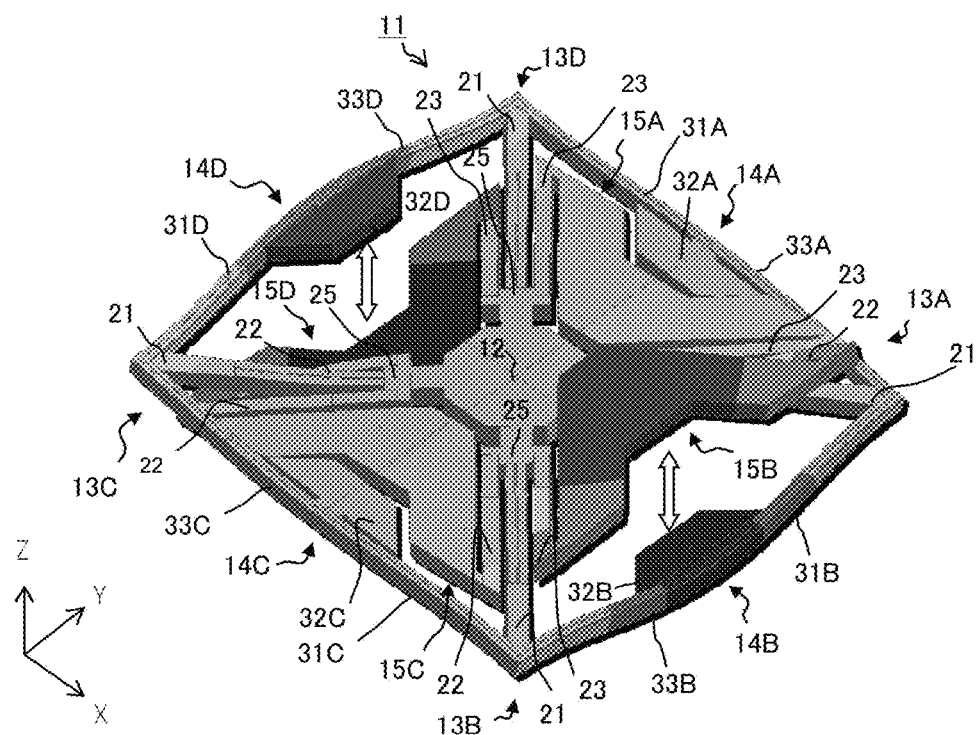
FIG. 4 illustrates a detection vibration mode when an angular velocity is acting around a Y axis in the vibrating body according to the 1st preferred embodiment of the present invention.

FIG. 4 is an X-Y plane plan view illustrating a deformation state in the 2nd detection vibration mode of the vibrating body 11.

The 2nd detection vibration mode is excited by an angular velocity around the Y axis in the angular velocity detection element 10 and is detected from the vibrating body 11 by using detection elements, which will be described later.

An angular velocity around the Y axis parallel to the planar surface acts on the vibrating body 11 vibrating in the driven vibration mode and as a result Coriolis forces along the Z axis orthogonal to the axis around which the angular velocity acts and to the direction of the driven vibration are generated in the weights 32B and 32D, which are undergoing driven vibration in a direction orthogonal to the axis around which the angular velocity acts. A vibration of the 2nd detection vibration mode is excited in the vibrating body 11 by the Coriolis forces.

The directions of driven vibration of the weights 32B and 32D, which oppose each other, are opposite to each other and therefore the directions in which the Coriolis forces act are opposite to each other. Thus, in the 2nd detection vibration mode, the weights 32B and 32D are displaced in opposite directions along the Z axis. At this time, a Coriolis force along the Z axis and a displacement along the Z axis are not generated for the weights 32A and 32C, which are undergoing driven vibration in a direction parallel to the axis around which the angular velocity acts.

Therefore, the external connection beams 14B and 14D to which the weights 32B and 32D are attached undergo detection vibration so as to bend in opposite directions to each other along the Z axis. Thus, vibration in the 2nd detection vibration mode does not cause displacement such that the weights 32A to 32D have mirror image relationships with each other as in the above-described driven vibration mode (non-mirror-image relationships) and therefore the detection vibrations of the external connection beams 14B and 14D are transmitted to the central detection beams 21 of the detection beams 13A and 13B and to the central detection beams 21 of the detection beams 13C and 13D. Thus, the central detection beams 21 of the detection beams 13A and 13D and the central detection beams 21 of the detection beams 13C and 13D undergo detection vibration so as to bend in opposite directions to each other along the Z axis.

The right detection beam 23 of the detection beam 13A, the internal connection beam 15B and the left detection beam 22 of the detection beam 13B are connected between the central detection beams 21 of the detection beams 13A and 13B. The right detection beam 23 of the detection beam 13A, the internal connection beam 15B and the left detection beam 22 of the detection beam 13B undergo coupled vibration with the detection vibrations of the central detection beams 21 of the detection beams 13A and 13B and the external connection beam 14B. That is, the right detection beam 23 of the detection beam 13A, the internal connection beam 15B and the left detection beam 22 of the detection beam 13B undergo detection vibration in the opposite direction to the central detection beams 21 of the detection beams 13A and 13B and the external connection beam 14B along the Z axis.

The right detection beam 23 of the detection beam 13C, the internal connection beam 15D and the left detection beam 22 of the detection beam 13D are connected between the central detection beams 21 of the detection beams 13C and 13D. The right detection beam 23 of the detection beam 13C, the internal connection beam 15D and the left detection beam 22 of the detection beam 13D undergo coupled vibration with the detection vibrations of the central detection beams 21 of the detection beams 13C and 13D and the external connection beam 14D. That is, the right detection beam 23 of the detection beam 13C, the internal connection beam 15D and the left detection beam 22 of the detection beam 13D undergo detection vibration in the opposite direction to the central detection beams 21 of the detection beams 13C and 13D and the external connection beam 14D along the Z axis.

Therefore, the right detection beam 23 of the detection beam 13A, the internal connection beam 15B and the left detection beam 22 of the detection beam 13B undergo detection vibration in the opposite direction to the right detection beam 23 of the detection beam 13C, the internal connection beam 15D and the left detection beam 22 of the detection beam 13D along the Z axis.

Thus, in the 2nd detection vibration mode, the external connection beam 14B and the internal connection beam 15B undergo detection vibration in opposite directions to each other along the Z axis, and the external connection beam 14D and the internal connection beam 15D undergo detection vibration in opposite directions to each other along the Z axis. Therefore, not only the external connection beams 14B and 14D, which vibrate in the driven vibration mode, but also the internal connection beams 15B and 15D, which are static in the driven vibration mode, undergo detection vibration and vibrations of the internal connection beams 15B and 15D are detected by detection elements, which will be described later, and thus it is possible to detect only the detection vibrations without detecting the driven vibrations.

In addition, detection vibrations in the Z axis direction transmitted from the external connection beams 14B and 14D and detection vibrations in the Z axis direction transmitted from the internal connection beams 15B and 15D are transmitted with opposite phases and therefore cancel each other out in the connection portions 25 of the detection beams 13A to 13D. Thus, detection vibrations transmitted to the central base 12 from the connection portions 25 via the base end detection beams 24 are greatly reduced and the energy of detection vibrations does not escape from the central base 12. In addition, even if the support substrate (external structure) to which the central base is fixed deforms or vibrates as a result of receiving a stress, a vibration of the 2nd detection vibration mode is not generated in the vibrating body 11 due to the effect of such a deformation or vibration. Therefore, the detection sensitivity and detection accuracy are further improved and generation of variations in characteristics is significantly reduced or prevented.

Figure 5:
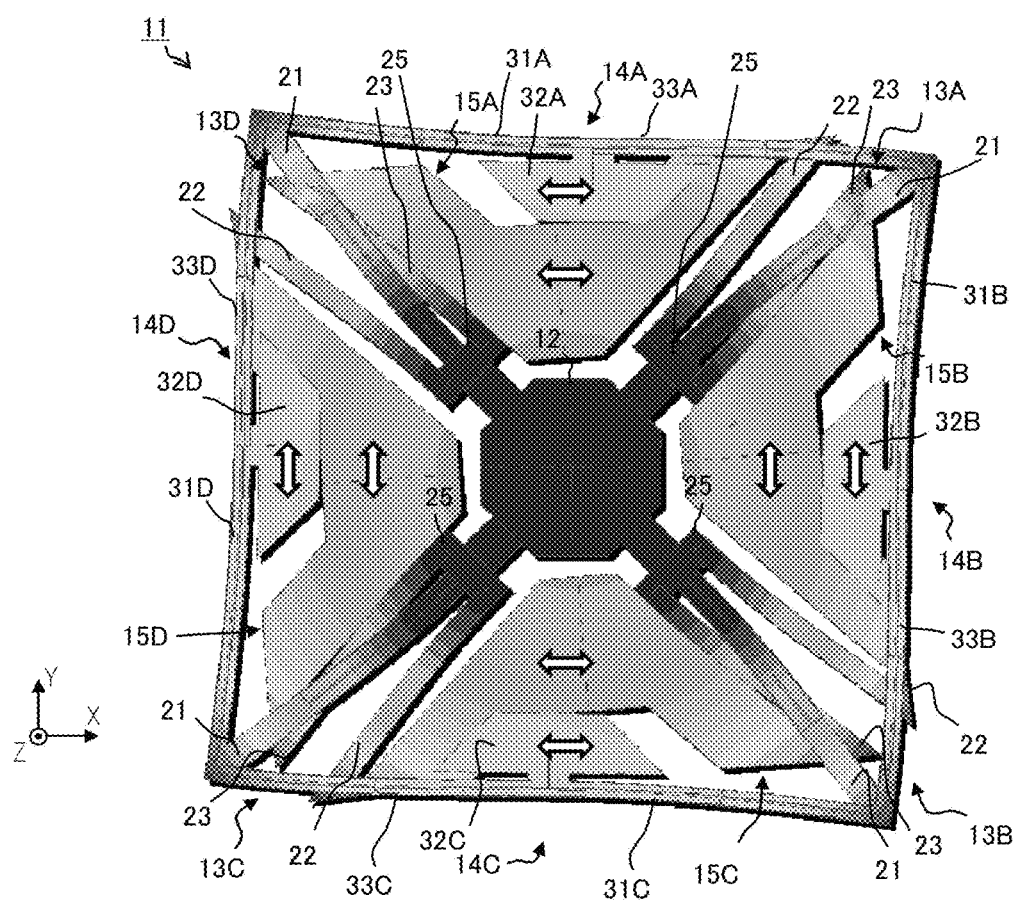
FIG. 5 illustrates a detection vibration mode when an angular velocity is acting around a Z axis in the vibrating body according to the 1st preferred embodiment of the present invention.

FIG. 5 is an XY plane plan view illustrating a deformation state in the 3rd detection vibration mode of the vibrating body 11.

The 3rd detection vibration mode is excited by an angular velocity around the Z axis in the angular velocity detection element 10 and is detected from the vibrating body 11 by using detection elements, which will be described later.

An angular velocity around the Z axis orthogonal to the planar surface acts on the vibrating body 11 vibrating in the driven vibration mode and as a result Coriolis forces along the X axis orthogonal to the axis around which the angular velocity acts and to the direction of the driven vibration are generated in the weights 32A and 32C, which are undergoing driven vibration along the Y axis orthogonal to the axis around which the angular velocity acts. In addition, Coriolis forces along the Y axis orthogonal to the axis around which the angular velocity acts and to the direction of the driven vibration are generated in the weights 32B and 32D, which are undergoing driven vibration along the X axis orthogonal to the axis around which the angular velocity acts. A vibration of the 3rd detection vibration mode is excited in the vibrating body 11 by the Coriolis forces.

The directions of driven vibration of the adjacent weights 32A to 32D are shifted from each other by 90° and therefore the directions in which the Coriolis forces act are also shifted from each other by 90°. Thus, in the 3rd detection vibration mode, the weights 32A to 32D undergo detection vibration so as to alternately rotate in a clockwise direction around the Z axis and in an anti-clockwise direction around the Z axis in the planar surface (X-Y plane).

Therefore, the external connection beams 14A to 14D to which the weights 32A to 32D are attached undergo detection vibration in the same direction as each other so as to alternately rotate in a clockwise direction around the Z axis and in an anti-clockwise direction around the Z axis in the planar surface (X-Y plane). Thus, vibration in the 3rd detection vibration mode does not cause displacement such that the weights 32A to 32D have mirror image relationships with each other as in the above-described driven vibration mode (non-mirror-image relationships) and therefore the detection vibrations of the external connection beams 14A to 14D are transmitted to the central detection beams 21 of the detection beams 13A to 13D. Thus, the central detection beams 21 of the detection beams 13A to 13D undergo detection vibration in the same direction as each other so as to alternately bend in the right direction and the left direction with respect to the radial directions.

The left detection beams 22 and the right detection beams 23 of the detection beams 13A to 13D are connected between the central detection beams 21 of the detection beams 13A to 13D. The left detection beams 22 and the right detection beams 23 of the detection beams 13A to 13D and the internal connection beams 15A to 15D undergo coupled vibration with the detection vibrations of the central detection beams 21 of the detection beams 13A to 13D and the external connection beams 14A to 14D. That is, the left detection beams 22 and the right detection beams 23 of the detection beams 13A to 13D and the internal connection beams 15A to 15D undergo detection vibration in the opposite direction to the central detection beams 21 of the detection beams 13A to 13D and the external connection beams 14A to 14D along the Z axis.

Thus, in the 3rd detection vibration mode, the external connection beams 14A to 14D and the internal connection beams 15A to 15D undergo detection vibration in opposite directions to each other so as to alternately rotate in a clockwise direction around the Z axis and in an anticlockwise direction around the Z axis in the planar surface (X-Y plane). Therefore, not only the external connection beams 14A to 14D, which vibrate in the driven vibration mode, but also the internal connection beams 15A to 15D, which are static in the driven vibration mode, undergo detection vibration and vibrations of the internal connection beams 15A to 15D are detected by detection elements, which will be described later, and thus it is possible to detect only the detection vibrations without detecting the driven vibrations.

In addition, detection vibrations transmitted from the external connection beams 14A to 14D and detection vibrations transmitted from the internal connection beams 15A to 15D are transmitted with opposite phases and therefore cancel each other out in the detection beams 13A to 13D.

Thus, detection vibrations transmitted to the central base 12 from the connection portions 25 via the base end detection beams 24 are greatly reduced and the energy of detection vibrations does not escape from the central base 12. In addition, even if the support substrate (external structure) to which the central base is fixed deforms or vibrates as a result of receiving a stress, a vibration of the 3rd detection vibration mode is not generated in the vibrating body 11 due to the effect of such a deformation or vibration. Therefore, the detection sensitivity and detection accuracy are further improved and generation of variations in characteristics is significantly reduced or prevented.

As has been described above, in the driven vibration mode, the 1st detection vibration mode, the 2nd detection vibration mode and the 3rd detection vibration mode of the vibrating body 11, transmission of vibrations in the central base 12 is closed, vibration energy does not escape from the central base 12, and even if the support substrate (external structure) to which the central base 12 is fixed deforms or vibrates as a result of receiving a stress, a vibration of each vibration mode is not generated in the vibrating body 11 due to the effect of such a deformation or vibration. Therefore, detection sensitivity and detection accuracy are greatly improved. In addition, even if there is a change in stress or temperature in the support substrate (external structure), generation of variations in characteristics is significantly reduced or prevented.

Next, description will be given of a configuration in which the vibrating body 11 is provided with piezoelectric elements as driving elements and detection elements in the angular velocity detection element 10 according to the 1st preferred embodiment. An electrostatic force or an electrostatic capacitance may be used as driving elements and detection elements instead of piezoelectric elements, for example.

Figure 6:
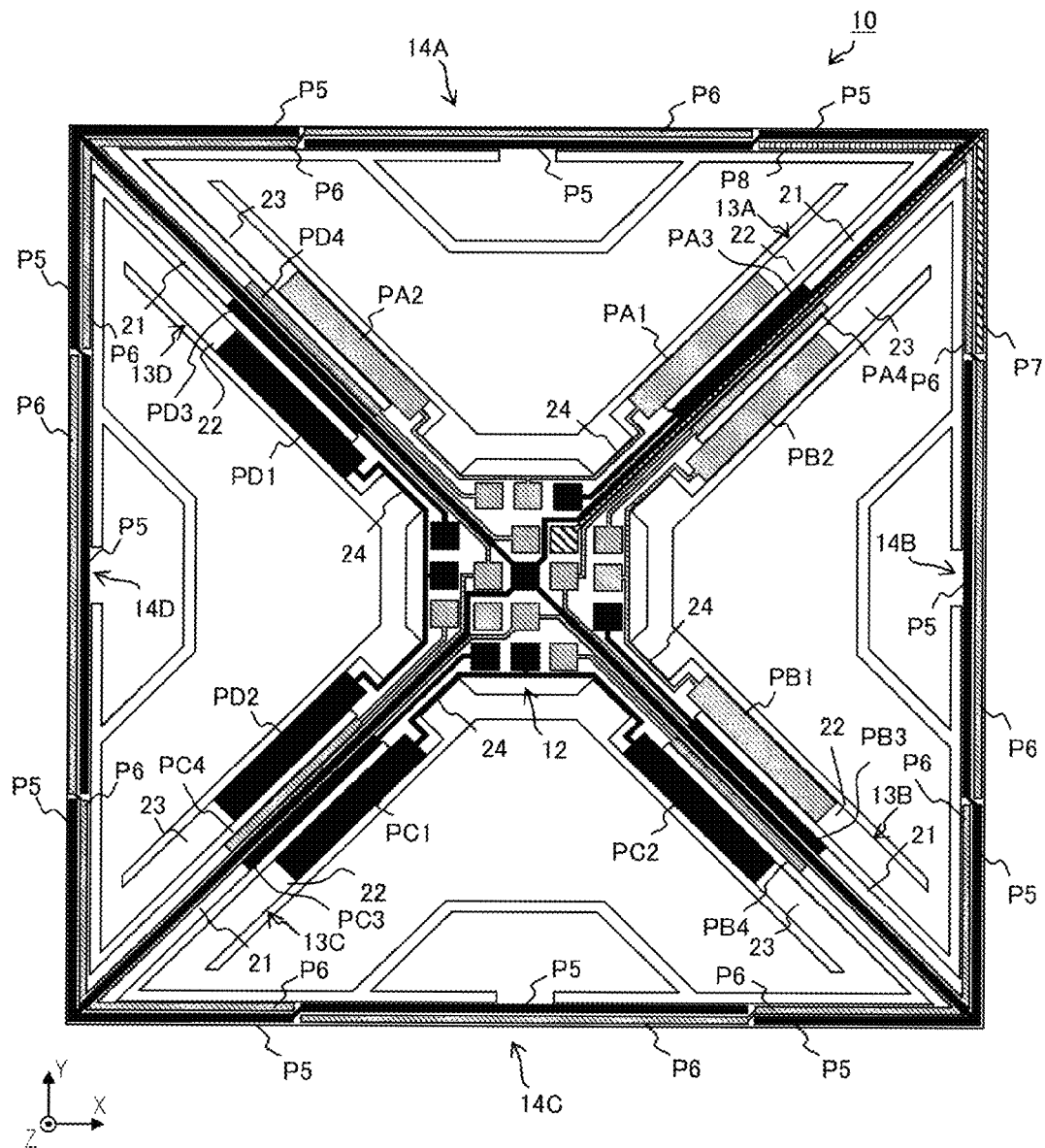
FIG. 6 illustrates piezoelectric elements of the angular velocity detection element according to the 1st preferred embodiment of the present invention.

FIG. 6 is an X-Y plane plan view of the angular velocity detection element 10.

The angular velocity detection element 10 includes detection piezoelectric elements PA1, PA2, PA3, PA4, PB1, PB2, PB3, PB4, PC1, PC2, PC3, PC4, PD1, PD2, PD3 and PD4, driving piezoelectric elements P5 and P6, a monitor piezoelectric element P7 and a dummy piezoelectric element P8.

Each of the piezoelectric elements PA1 to PA4, PB1 to PB4, PC1 to PC4, PD1 to PD4 and P5 to P8 is located on the planar surface of the vibrating body 11 and includes an upper electrode, a lower electrode and a piezoelectric layer. The piezoelectric layer is a thin film made of any piezoelectric material such as aluminum nitride, lead zirconate titanate, potassium sodium niobate or zinc oxide. The upper electrode and lower electrode are preferably made of, for example, titanium, gold, palladium, iridium or an alloy of such metals. The lower electrode is provided on a lower surface of the piezoelectric layer and is connected to ground. The upper electrode is provided on an upper surface of the piezoelectric layer and is connected to a circuit section, which is not illustrated, via a wiring electrode and a land electrode. The wiring electrode and the land electrode may include single layer electrodes or may be a portion of the piezoelectric element including the piezoelectric layer. In addition, the lower electrode need not be provided if the vibrating body has conductivity.

More specifically, the driving piezoelectric elements P5 are located in a region on the outside in the radial direction in the vicinity of an end portion on the negative X axis direction side, in a region on the inside in the radial direction in the vicinity of the center, and in a region on the outside in the radial direction in the vicinity of an end portion on the positive X axis direction side in the external connection beam 14A. On the other hand, the piezoelectric elements P6 are located in a region on the inside in the radial direction in the vicinity of an end portion on the negative X axis direction side and in a region on the outside in the radial direction in the vicinity of the center in the external connection beam 14A.

In addition, the piezoelectric elements P5 are located in a region on the outside in the radial direction in the vicinity of an end portion on the negative Y axis direction side and in a region on the inside in the radial direction in the vicinity of the center in the external connection beam 14B. On the other hand, the driving piezoelectric elements P6 are located in a region on the inside in the radial direction in the vicinity of an end portion on the negative Y axis direction side, in a region on the outside in the radial direction in the vicinity of the center, and in a region on the inside in the radial direction in the vicinity of an end portion on the positive Y axis direction side in the external connection beam 14B.

In addition, the driving piezoelectric elements P5 are located in a region on the outside in the radial direction in the vicinity of an end portion on the negative X axis direction side, in a region on the inside in the radial direction in the vicinity of the center, and in a region on the outside in the radial direction in the vicinity of an end portion on the positive X axis direction side in the external connection beam 14C. On the other hand, the driving piezoelectric elements P6 are located in a region on the inside in the radial direction in the vicinity of an end portion on the negative X axis direction side, in a region on the outside in the radial direction in the vicinity of the center, and in a region on the inside in the radial direction in the vicinity of an end portion on the positive X axis direction side in the external connection beam 14C.

In addition, the driving piezoelectric elements P5 are located in a region on the outside in the radial direction in the vicinity of an end portion on the negative Y axis direction side, in a region on the inside in the radial direction in the vicinity of the center, and in a region on the outside in the radial direction in the vicinity of an end portion on the positive Y axis direction side in the external connection beam 14D. On the other hand, the driving piezoelectric elements P6 are located in a region on the inside in the radial direction in the vicinity of an end portion on the negative Y axis direction side, in a region on the outside in the radial direction in the vicinity of the center, and in a region on the inside in the radial direction in the vicinity of an end portion on the positive Y axis direction side in the external connection beam 14D.

The driving piezoelectric elements P5 and the driving piezoelectric elements P6 are supplied with alternating current voltages set with opposite phases. Thus, a vibration of the driven vibration mode illustrated in FIG. 2 is generated in the vibrating body 11.

The configuration and arrangement of the driving piezoelectric elements P5 and P6 illustrated here is just an example and the arrangement of the driving piezoelectric elements P5 and P6 may be any arrangement so long as the arrangement can cause a vibration of the driven vibration mode illustrated in FIG. 2 to be generated. The configuration and arrangement of the driving piezoelectric elements P5 and P6 may be decided upon in accordance with the polarities of distortion generated in the external connection beams in the driven vibration mode. That is, since the polarities of distortion generated in an external connection beam change in a region on the inside and a region on the outside in the radial direction with the center of the external connection beam in the width direction acting as a boundary, the driving piezoelectric elements P5 may be arranged in one of the region on the inside and the region on the outside in the radial direction and the driving piezoelectric elements P6 may be arranged in the other of the region on the inside and the region on the outside in the radial direction. Furthermore, since the polarities of distortion generated in an external connection beam change in the region in the vicinity of the center and in the regions in the vicinities of both ends in the direction of extension of the external connection beam, the driving piezoelectric elements P5 may be located in one of the region in the vicinity of the center and the regions in the vicinities of both ends of the external connection beam and the driving piezoelectric elements P6 may be located in the other of the region in the vicinity of the center and the regions in the vicinities of both ends of the external connection beam. In addition, both the driving piezoelectric elements P5 and the driving piezoelectric elements P6 do not necessarily have to be provided and only one may instead be provided.

The monitor piezoelectric element P7 is provided in order to subject the driving voltage to feedback control and detects a voltage corresponding to the driven vibration. The monitor piezoelectric element P7 is located in a region on the outside in the radial direction in the vicinity of an end portion on the positive Y axis direction side in the external connection beam 14B and is connected to a land electrode via a wiring electrode. By subjecting the driving voltage to feedback control using the monitor piezoelectric element P7, a stable detection vibration is realized. Therefore, detection sensitivity and detection accuracy are improved. The monitor piezoelectric element P7 may be located in any region on the external connection beams 14A to 14D provided that the region is a region in which a single polarity of distortion is generated in the external connection beam in the driven vibration mode. In addition, the monitor piezoelectric element P7 may be provided in a plurality.

The dummy piezoelectric element P8 is provided in order to maintain symmetry of the arrangement of the piezoelectric elements provided in the vibrating body 11 and maintain symmetry of the vibrations generated in the vibrating body 11 and is located in a region on the inside in the radial direction in the vicinity of an end portion on the positive X axis direction side in the external connection beam 14A.

The detection piezoelectric elements PA1, PA2, PA3, PA4, PB1, PB2, PB3, PB4, PC1, PC2, PC3, PC4, PD1, PD2, PD3 and PD4 are provided on the detection beams 13A to 13D and are connected to a detection circuit (differential amplifier circuit) via wiring electrodes and land electrodes.

The detection piezoelectric elements PA1 and PA2 and the detection piezoelectric elements PC1 and PC2 are configured to detect an angular velocity acting around the X axis. The detection piezoelectric element PA1 is arranged on the left detection beam 22 of the detection beam 13A and extends in a radial direction of the detection beam 13A. The detection piezoelectric element PA2 is arranged on the right detection beam 23 of the detection beam 13D and extends in a radial direction of the detection beam 13D. The detection piezoelectric element PA1 and the detection piezoelectric element PA2 are connected to the same land electrode via wiring electrodes. The detection piezoelectric element PC1 is arranged on the left detection beam 22 of the detection beam 13C and extends in a radial direction of the detection beam 13C. The detection piezoelectric element PC2 is arranged on the right detection beam 23 of the detection beam 13B and extends in a radial direction of the detection beam 13B. The detection piezoelectric element PC1 and the detection piezoelectric element PC2 are connected to the same land electrode via wiring electrodes.

Therefore, in the 1st detection vibration mode illustrated in FIG. 3, the detection piezoelectric elements PC1 and PC2 contract when the detection piezoelectric elements PA1 and PA2 extend, and the detection piezoelectric element PC1 and PC2 extend when the detection piezoelectric elements PA1 and PA2 contract, and voltages of opposite polarities are generated in the detection piezoelectric elements PA1 and PA2 and the detection piezoelectric elements PC1 and PC2.

On the other hand, in the 2nd detection vibration mode illustrated in FIG. 4, the detection piezoelectric element PA2 contracts when the detection piezoelectric element PA1 extends and the detection piezoelectric element PA2 extends when the detection piezoelectric element PA1 contracts and voltages of opposite polarities attempt to be generated in the detection piezoelectric element PA1 and the detection piezoelectric element PA2, but a change in voltage is not generated because the detection piezoelectric element PA1 and the detection piezoelectric element PA2 are connected to each other. In addition, the detection piezoelectric element PC2 contracts when the detection piezoelectric element PC1 extends and the detection piezoelectric element PC2 extends when the detection piezoelectric element PC1 contracts and an attempt is made for voltages of opposite polarities to be generated in the detection piezoelectric element PC1 and the detection piezoelectric element PC2, but a change in voltage is not generated because the detection piezoelectric element PC1 and the detection piezoelectric element PC2 are connected to each other. Furthermore, in the 3rd detection vibration mode illustrated in FIG. 5, voltages are not generated in the detection piezoelectric elements PA1, PA2, PC1 and PC2.

Therefore, the voltage of a land electrode to which the detection piezoelectric elements PA1 and PA2 are connected and the voltage of a land electrode to which the detection piezoelectric elements PC1 and PC2 are connected are subjected to differential amplification, and thus an angular velocity around the X axis is detected without detecting an angular velocity around the Y axis and an angular velocity around the Z axis.

The arrangement of the detection piezoelectric elements PA1, PA2, PC1 and PC2 may be any arrangement so long as it is an arrangement with which the 1st detection vibration mode is generated and the driven vibration mode is not generated. However, it is preferable that an arrangement that has mirror symmetry be adopted such that the same voltages are generated in the detection piezoelectric elements PA1, PA2, PC1 and PC2 in vibration of the detection beams caused by the 2nd detection vibration mode. Thus, even if deformation in which bending occurs in the Z axis directions occurs in the detection piezoelectric elements PA1, PA2, PC1 and PC2 in the 2nd detection vibration mode, charges generated in the detection piezoelectric elements PA1, PA2, PC1 and PC2 cancel each other out and an unwanted electrical signal is not generated. In addition, it is preferable that an arrangement having mirror symmetry about a central line in the width direction be adopted for the left detection beams and the right detection beams on which the detection piezoelectric elements PA1, PA2, PC1 and PC2 are provided such that charges are not generated in the detection piezoelectric elements PA1, PA2, PC1 and PC2 in vibration of the detection beams caused by the 3rd detection vibration mode. Thus, even if deformation in which bending occurs within the planar surface occurs in the detection piezoelectric elements PA1, PA2, PC1 and PC2 in the 3rd detection vibration mode, charges are not generated in the detection piezoelectric elements PA1, PA2, PC1 and PC2 and an unwanted electrical signal is not generated.

The detection piezoelectric elements PB1 and PB2 and the detection piezoelectric elements PD1 and PD2 are configured to detect an angular velocity acting around the Y axis. The detection piezoelectric element PB1 is arranged on the left detection beam 22 of the detection beam 13B and extends in a radial direction of the detection beam 13B. The detection piezoelectric element PB2 is arranged on the right detection beam 23 of the detection beam 13A and extends in a radial direction of the detection beam 13A. The detection piezoelectric element PB1 and the detection piezoelectric element PB2 are connected to the same land electrode via wiring electrodes. The detection piezoelectric element PD1 is arranged on the left detection beam 22 of the detection beam 13D and extends in a radial direction of the detection beam 13D. The detection piezoelectric element PD2 is arranged on the right detection beam 23 of the detection beam 13C and extends in a radial direction of the detection beam 13C. The detection piezoelectric element PD1 and the detection piezoelectric element PD2 are connected to the same land electrode via wiring electrodes.

Therefore, in the 2nd detection vibration mode illustrated in FIG. 4, the detection piezoelectric element PD1 and PD2 contract when the detection piezoelectric elements PB1 and PB2 extend and the detection piezoelectric elements PD1 and PD2 extend when the detection piezoelectric elements PB1 and PB2 contract and voltages of opposite polarities are generated in the detection piezoelectric elements PB1 and PB2 and the detection piezoelectric elements PD1 and PD2.

On the other hand, in the 1st detection vibration mode illustrated in FIG. 3, the detection piezoelectric element PB2 contracts when the detection piezoelectric element PB1 extends and the detection piezoelectric element PB2 extends when the detection piezoelectric element PB1 contracts and voltages of opposite polarities attempt to be generated in the detection piezoelectric element PB1 and the detection piezoelectric element PB2, but a change in voltage is not generated because the detection piezoelectric element PB1 and the detection piezoelectric element PB2 are connected to each other. In addition, the detection piezoelectric element PD2 contracts when the detection piezoelectric element PD1 extends and the detection piezoelectric element PD2 extends when the detection piezoelectric element PD1 contracts and an attempt is made for voltages of opposite polarities to be generated in the detection piezoelectric element PD1 and the detection piezoelectric element PD2, but a change in voltage is not generated because the detection piezoelectric element PD1 and the detection piezoelectric element PD2 are connected to each other. Furthermore, in the 3rd detection vibration mode illustrated in FIG. 5, voltages are not generated in the detection piezoelectric elements PB1, PB2, PD1 and PD2.

Therefore, the voltage of a land electrode to which the detection piezoelectric elements PB1 and PB2 are connected and the voltage of a land electrode to which the detection piezoelectric elements PD1 and PD2 are connected are subjected to differential amplification, and thus an angular velocity around the Y axis is detected without detecting an angular velocity around the X axis and an angular velocity around the Z axis.

The arrangement of the detection piezoelectric elements PB1, PB2, PD1 and PD2 may be any arrangement so long as it is an arrangement with which the 2nd detection vibration mode is generated and the driven vibration mode is not generated. However, it is preferable that an arrangement that has mirror symmetry be adopted such that the same voltages are generated in the detection piezoelectric elements PB1, PB2, PD1 and PD2 in vibration of the detection beams by the 1st detection vibration mode. Thus, even if deformation in which bending occurs in the Z axis directions occurs in the detection piezoelectric elements PB1, PB2, PD1 and PD2 in the 1st detection vibration mode, charges generated in the detection piezoelectric elements PB1, PB2, PD1 and PD2 cancel each other out and an unwanted electrical signal is not generated. In addition, it is preferable that an arrangement having mirror symmetry about a central line in the width direction be adopted for the left detection beams and the right detection beams on which the detection piezoelectric elements PB1, PB2, PD1 and PD2 are provided such that charges are not generated in the detection piezoelectric elements PB1, PB2, PD1 and PD2 in vibration of the detection beams caused by the 3rd detection vibration mode. Thus, even if deformation in which bending occurs within the planar surface occurs in the detection piezoelectric elements PB1, PB2, PD1 and PD2 in the 3rd detection vibration mode, charges are not generated in the detection piezoelectric elements PB1, PB2, PD1 and PD2 and an unwanted electrical signal is not generated.

The detection piezoelectric elements PA3, PB3, PC3 and PD3 and the detection piezoelectric elements PA4, PB4, PC4 and PD4 are configured to detect an angular velocity acting around the Z axis and are connected to separate land electrodes via respective wiring electrodes.

The detection piezoelectric element PA3 is arranged on the left side of the central detection beam 21 of the detection beam 13A in the radial direction and extends in the radial direction of the detection beam 13A. The detection piezoelectric element PA4 is arranged on the right side of the central detection beam 21 of the detection beam 13A in the radial direction and extends in the radial direction of the detection beam 13A.

The detection piezoelectric element PB3 is arranged on the left side of the central detection beam 21 of the detection beam 13B in the radial direction and extends in the radial direction of the detection beam 13B. The detection piezoelectric element PB4 is arranged on the right side of the central detection beam 21 of the detection beam 13B in the radial direction and extends in the radial direction of the detection beam 13B.

The detection piezoelectric element PC3 is arranged on the left side of the central detection beam 21 of the detection beam 13C in the radial direction and extends in the radial direction of the detection beam 13C. The detection piezoelectric element PC4 is arranged on the right side of the central detection beam 21 of the detection beam 13C in the radial direction and extends in the radial direction of the detection beam 13C.

The detection piezoelectric element PD3 is arranged on the left side of the central detection beam 21 of the detection beam 13D in the radial direction and extends in the radial direction of the detection beam 13D. The detection piezoelectric element PD4 is arranged on the right side of the central detection beam 21 of the detection beam 13D in the radial direction and extends in the radial direction of the detection beam 13D.

Therefore, in the 3rd detection vibration mode generated by an angular velocity acting around the Z axis as illustrated in FIG. 5, the detection piezoelectric elements PA4, PB4, PC4 and PD4 contract when the detection piezoelectric elements PA3, PB3, PC3 and PD3 extend, the detection piezoelectric elements PA4, PB4, PC4 and PD4 extend when the detection piezoelectric elements PA3, PB3, PC3 and PD3 contract, and voltages of opposite polarities are generated in the detection piezoelectric elements PA3, PB3, PC3 and PD3 and the detection piezoelectric elements PA4, PB4, PC4 and PD4.

On the other hand, in the 1st detection vibration mode illustrated in FIG. 3, the same voltages are generated in the detection piezoelectric elements PA3, PA4, PD3 and PD4 and the detection piezoelectric elements PB3, PB4, PC3 and PC4. In addition, in the 2nd detection vibration mode illustrated in FIG. 4, the same voltages are generated in the detection piezoelectric elements PA3, PA4, PB3 and PB4 and the detection piezoelectric elements PC3, PC4, PD3 and PD4.

Therefore, if a land electrode, to which the detection piezoelectric elements PA3, PB3, PC3 and PD3 are connected is connected and a land electrode to which the detection piezoelectric elements PA4, PB4, PC4 and PD4 are connected is connected and the voltages of these land electrodes are subjected to differential amplification, an angular velocity around the Z axis is detected without detecting an angular velocity around the X axis and an angular velocity around the Y axis.

The arrangement of the detection piezoelectric elements PA3, PB3, PC3, PD3, PA4, PB4, PC4 and PD4 may be any arrangement so long as it is an arrangement with which the 3rd detection vibration mode is generated and the driven vibration mode is not generated. However, it is preferable that an arrangement having mirror symmetry about a stress neutral axis within the planar surface be adopted for the central detection beams on which the detection piezoelectric elements are provided such that an unwanted electrical signal is not generated in vibration of the detection beams caused by the 1st detection vibration mode and the 2nd detection vibration mode. Thus, even if deformation is generated in the detection piezoelectric elements PA3, PB3, PC3, PD3, PA4, PB4, PC4 and PD4 in the 1st and 2nd detection vibration modes, charges are similarly generated in the detection piezoelectric elements PA3, PB3, PC3 and PD3 and the detection piezoelectric elements PA4, PB4, PC4 and PD4 and an unwanted electrical signal is not generated.

The angular velocity detection element 10 according to the 1st preferred embodiment of the present invention is preferably configured as described above and is capable of separately detecting angular velocities around three axes of an orthogonal coordinates system. A detection vibration of the vibrating body 11 is detected without detecting a driven vibration of the vibrating body 11 and generation of an unwanted detection signal is prevented. In addition, driven vibrations and detection vibrations of the vibrating body 11 are confined to the external connection beams 14A to 14D, the internal connection beams 15A to 15D and the detection beams 13A to 13D and do not escape to the support substrate via the central base 12. Therefore, the vibration efficiencies of driven vibration and detection vibration are high and high detection sensitivity and detection accuracy are realized. In addition, the effect of stress and vibration acting on the support substrate is not transmitted to the driven vibration and the detection vibration and as a result of this as well high detection sensitivity and detection accuracy are realized. Furthermore, the effect of changes in stress acting on the support substrate and changes in temperature are not transmitted to the driven vibration and the detection vibration and therefore an angular velocity detection element 10 having little variation in characteristics is provided.

In the vibrating body 11, not only the external connection beams 14A to 14D but also the internal connection beams 15A to 15D may be caused to undergo driven vibration so as to bend along the radial directions. In this case, it is preferable that detection vibrations generated in the external connection beams 14A to 14D be detected as coupled vibrations coupled with the detection vibrations of the internal connection beams 15A to 15D.

Next, an angular velocity detection element according to a 2nd preferred embodiment of the present invention will be described. In the angular velocity detection element according to the 2nd preferred embodiment, the internal connection beams, rather than the external connection beams, are caused to undergo driven vibration in the vibrating body so as to bend along the radial directions and detection vibrations of the external connection beams generated as coupled vibrations coupled with the detection vibrations of the internal connection beams are detected. However, similarly to as in the 1st preferred embodiment, the external connection beams, rather than the internal connection beams, may be caused to undergo driven vibration in the vibrating body so as to bend along the radial directions and detection vibrations of the internal connection beams generated as coupled vibrations coupled with the detection vibrations of the external connection beams may be detected.

Figure 7A:
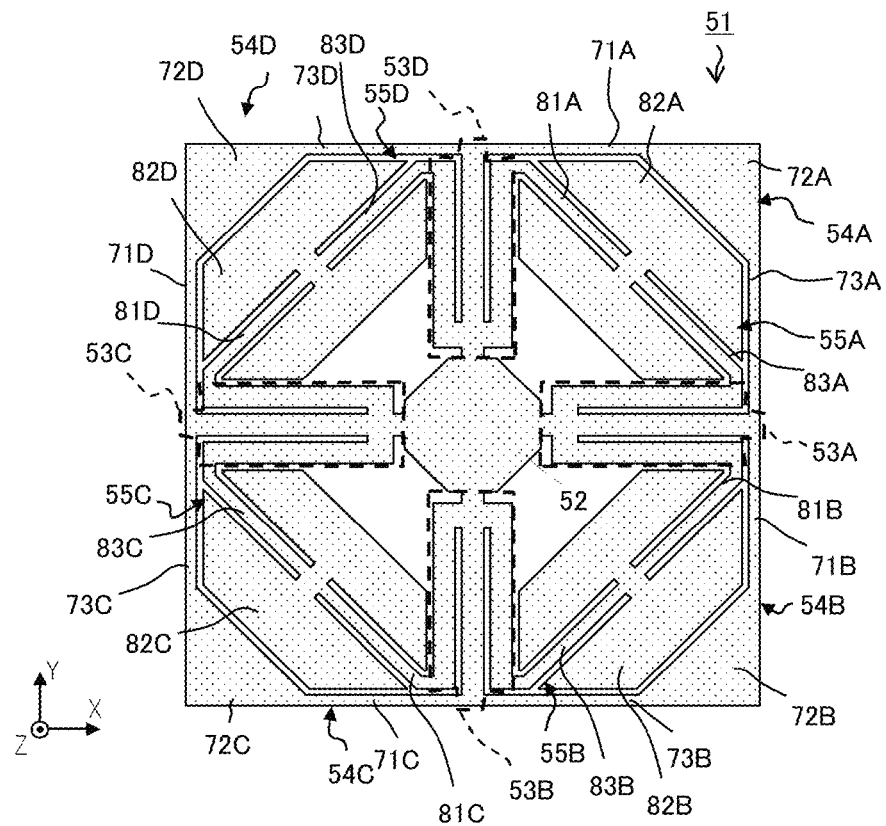
FIGS. 7A and 7B illustrate a vibrating body of an angular velocity detection element according to a 2nd preferred embodiment of the present invention.

FIG. 7A is an X-Y plane plan view illustrating a vibrating body 51 of an angular velocity detection element 50 according to the 2nd preferred embodiment of the present invention.

The vibrating body 51 is supported by a support substrate, which is not illustrated. The vibrating body 51 includes a planar surface that is parallel to the X axis and the Y axis on the positive direction side of the Z axis and on the negative direction side of the Z axis. The vibrating body 51 preferably has a 4-fold rotationally symmetrical shape when looking at the planar surface. The vibrating body 51 includes a central base 52, detection beams 53A, 53B, 53C and 53D, external connection beams 54A, 54B, 54C and 54D and internal connection beams 55A, 55B, 55C and 55D.

The central base 52 is positioned at the center of the vibrating body 51 when looking at the planar surface. At least one of a surface of the central base 52 on the positive Z axis direction side and a surface of the central base 52 on the negative Z axis direction side is fixed to an external structure via a support substrate, which is not illustrated. The central base 52 supports the detection beams 53A to 53D, the external connection beams 54A to 54D and the internal connection beams 55A to 55D in a state of floating above the support substrate.

More specifically, the central base 52 preferably has an octagonal shape includes a side facing in a direction of a clockwise angle of 0° using the positive Y axis direction as a reference, a side facing in a 45° direction, a side facing in a 90° direction, a side facing in a 135° direction, a side facing in a 180° direction, a side orthogonal to a 225° direction, a side facing in a 270° direction and a side facing in a 315° direction within the planar surface.

The detection beams 53A to 53D are provided in a cross shape with respect to the central base 52 when looking at the planar surface. That is, the detection beams 53A to 53D extend in radial directions at equal angular intervals on the planar surface. Surfaces of the detection beams 53A to 53D on the positive Z axis direction side or the negative Z axis direction side oppose the planar surface of the support substrate with a gap therebetween.

More specifically, the detection beam 53A is connected near the center of a side of the central base 52 facing in a 90° direction and extends in a radial direction from the connection position with the central base 52, that is, extends in the 90° direction. The detection beam 53B is connected near the center of a side of the central base 52 facing in a 180° direction and extends toward the outside in a radial direction from the connection position with the central base 52, that is, extends in the 180° direction. The detection beam 53C is connected near the center of a side of the central base 52 facing in a 270° direction and extends toward the outside in a radial direction from the connection position with the central base 52, that is, extends in the 270° direction. The detection beam 53D is connected near the center of a side of the central base 52 facing in a 0° direction (360° direction) and extends toward the outside in a radial direction from the connection position with the central base 52, that is, extends in the 0° (360° direction) direction.

The external connection beams 54A to 54D are connected between adjacent detection beams 53A to 53D. Surfaces of the external connection beams 54A to 54D on the positive Z axis direction side or the negative Z axis direction side oppose the planar surface of the support substrate with a gap therebetween. In addition, the external connection beams 54A to 54D are connected to each other to define a rectangular frame shape when looking at the planar surface and the detection beams 53A to 53D are connected to the centers of the respective sides on the inside in the radial directions of the rectangular frame defined by the external connection beams 54A to 54D.

More specifically, the external connection beam 54A is arranged in a 45° direction with respect to the central base 52 when looking at the planar surface and includes a connection beam 71A, a weight 72A and a connection beam 73A. The connection beam 71A extends along the X axis, is connected to the detection beam 53D and the external connection beam 54D at an end portion thereof on the negative X axis direction side and is connected to the weight 72A at an end portion thereof on the positive X axis direction side. The connection beam 73A extends along the Y axis, is connected to the detection beam 53A and the external connection beam 54B at an end portion thereof on the negative Y axis direction side and is connected to the weight 72A at an end portion thereof on the positive Y axis direction side. The weight 72A has a triangular shape having a side that extends from the connection beam 71A, a side that extends from the connection beam 73A and a side that is parallel to the 135° direction, and is connected between the connection beam 71A and the connection beam 73A.

The external connection beam 54B is arranged in the 135° direction with respect to the central base 52 when looking at the planar surface and includes a connection beam 71B, a weight 72B and a connection beam 73B. The connection beam 71B extends along the Y axis, is connected to the detection beam 53A and the external connection beam 54A at an end portion thereof on the positive Y axis direction side and is connected to the weight 72B at an end portion thereof on the negative Y axis direction side. The connection beam 73B extends along the X axis, is connected to the detection beam 53B and the external connection beam 54C at an end portion thereof on the negative X axis direction side and is connected to the weight 72B at an end portion thereof on the positive X axis direction side. The weight 72B has a triangular shape having a side that extends from the connection beam 71B, a side that extends from the connection beam 73B and a side that is parallel to the 45° direction, and is connected between the connection beam 71B and the connection beam 73B.

The external connection beam 54C is arranged in a 225° direction with respect to the central base 52 when looking at the planar surface and includes a connection beam 71C, a weight 72C and a connection beam 73C. The connection beam 71C extends along the X axis, is connected to the detection beam 53B and the external connection beam 54B at an end portion thereof on the positive X axis direction side and is connected to the weight 72C at an end portion thereof on the negative X axis direction side. The connection beam 73C extends along the Y axis, is connected to the detection beam 53C and the external connection beam 54D at an end portion thereof on the positive Y axis direction side and is connected to the weight 72C at an end portion thereof on the negative Y axis direction side. The weight 72C has a triangular shape having a side that extends from the connection beam 71C, a side that extends from the connection beam 73C and a side that is parallel to the 135° direction, and is connected between the connection beam 71C and the connection beam 73C.

The external connection beam 54D is arranged in a 315° direction with respect to the central base 52 when looking at the planar surface and includes a connection beam 71D, a weight 72D and a connection beam 73D. The connection beam 71D extends along the Y axis, is connected to the detection beam 53C and the external connection beam 54C at an end portion thereof on the negative Y axis direction side and is connected to the weight 72D at an end portion thereof on the positive Y axis direction side. The connection beam 73D extends along the X axis, is connected to the detection beam 53D and the external connection beam 54A at an end portion thereof on the positive X axis direction side and is connected to the weight 72D at an end portion thereof on the negative X axis direction side. The weight 72D has a triangular shape having a side that extends from the connection beam 71D, a side that extends from the connection beam 73D and a side that is parallel to the 45° direction, and is connected between the connection beam 71D and the connection beam 73D.

The internal connection beams 55A to 55D are connected between adjacent detection beams 53A to 53D and are provided on the inside of the external connection beams 54A to 54D in the radial direction. Surfaces of the internal connection beams 55A to 55D on the positive Z axis direction side or the negative Z axis direction side oppose the planar surface of the support substrate with a gap therebetween.

More specifically, the internal connection beam 55A is arranged in a 45° direction with respect to the central base 52 when looking at the planar surface and includes a connection beam 81A, a weight 82A and a connection beam 83A. The connection beam 81A is parallel to the 135° direction, is connected to the weight 82A at an end portion thereof on the positive X axis direction side and is connected to the detection beam 53D at an end portion thereof on the negative X axis direction side. The connection beam 83A is parallel to the 135° direction, is connected to the weight 82A at an end portion thereof on the negative X axis direction side and is connected to the detection beam 53A at an end portion thereof on the positive X axis direction side. The weight 82A includes a pair of supplementary weights respectively arranged on the outside and the inside of the connection beams 81A and 83A in the radial direction and is connected between the connection beam 81A and the connection beam 83A.

The internal connection beam 55B is arranged in the 135° direction with respect to the central base 52 when looking at the planar surface and includes a connection beam 81B, a weight 82B and a connection beam 83B. The connection beam 81B is parallel to the 45° direction, is connected to the weight 82B at an end portion thereof on the negative X axis direction side and is connected to the detection beam 53A at an end portion thereof on the positive X axis direction side. The connection beam 83B is parallel to the 45° direction, is connected to the weight 82B at an end portion thereof on the positive X axis direction side and is connected to the detection beam 53B at an end portion thereof on the negative X axis direction side. The weight 82B includes a pair of supplementary weights respectively arranged on the outside and the inside of the connection beams 81B and 83B in the radial direction and is connected between the connection beam 81B and the connection beam 83B.

The internal connection beam 55C is arranged in a 225° direction with respect to the central base 52 when looking at the planar surface and includes a connection beam 81C, a weight 82C and a connection beam 83C. The connection beam 81C is parallel to the 135° direction, is connected to the weight 82C at an end portion thereof on the negative X axis direction side and is connected to the detection beam 53B at an end portion thereof on the positive X axis direction side. The connection beam 83C is parallel to the 135° direction, is connected to the weight 82C at an end portion thereof on the positive X axis direction side and is connected to the detection beam 53C at an end portion thereof on the negative X axis direction side. The weight 82C includes a pair of supplementary weights respectively arranged on the outside and the inside of the connection beams 81C and 83C in the radial direction and is connected between the connection beam 81C and the connection beam 83C.

The internal connection beam 55D is arranged in a 315° direction with respect to the central base 52 when looking at the planar surface and includes a connection beam 81D, a weight 82D and a connection beam 83D. The connection beam 81D is parallel to the 45° direction, is connected to the weight 82D at an end portion thereof on the positive X axis direction side and is connected to the detection beam 53C at an end portion thereof on the negative X axis direction side. The connection beam 83D is parallel to the 45° direction, is connected to the weight 82D at an end portion thereof on the negative X axis direction side and is connected to the detection beam 53D at an end portion thereof on the positive X axis direction side. The weight 82D includes a pair of supplementary weights respectively arranged on the outside and the inside of the connection beams 81D and 83D in the radial direction and is connected between the connection beam 81D and the connection beam 83D.

Figure 7B:
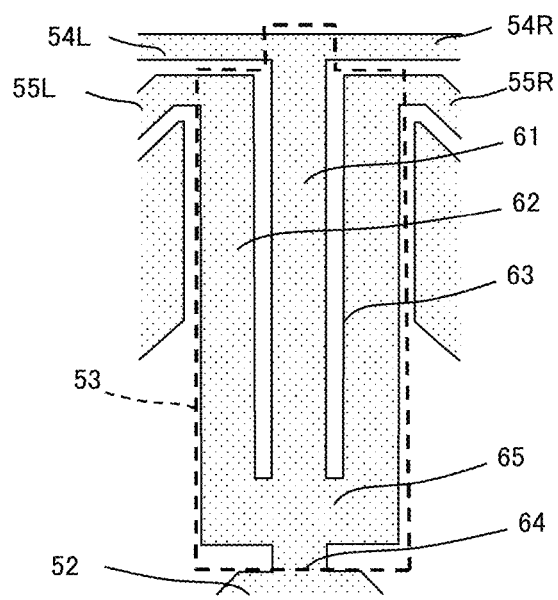

FIG. 7B is an X-Y plane plan view illustrating the structure in the vicinity of the detection beams 53A to 53D. In FIG. 7B, the reference numerals of the detection beams 53A to 53D have been changed to that of a detection beam 53. In addition, reference numerals of external connection beams 54A to 54D have been changed to that of an external connection beam 54L for one positioned to the left of the detection beam 53 and to that of an external connection beam 54R for one positioned to the right of the detection beam 53. In addition, reference numerals of internal connection beams 55A to 55D have been changed to that of an internal connection beam 55L for one positioned to the left of the detection beam 53 and to that of an internal connection beam 55R for one positioned to the right of the detection beam 53.

The detection beam 53 includes a central detection beam 61, a left detection beam 62, a right detection beam 63, a base end detection beam 64 and a connection portion 65. The central detection beam 61, the left detection beam 62, the right detection beam 63 and the base end detection beam 64 are connected to each other at the connection portion 65. The base end detection beam 64 extends in the radial direction, is connected to the central base 52 at an end portion thereof on the inside in the radial direction and is connected to the central detection beam 61, the left detection beam 62 and the right detection beam 63 via the connection portion 65 at an end portion thereof on the outside in the radial direction. The central detection beam 61 extends in the radial direction of the detection beam 53, is connected to the base end detection beam 64 via the connection portion 65 at an end portion thereof on the inside in the radial direction and is connected to the external connection beam 54L and the external connection beam 54R at an end portion thereof on the outside in the radial direction. The left detection beam 62 extends in the radial direction of the detection beam 53 adjacent to the left side of the central detection beam 61, is connected to the base end detection beam 64 via the connection portion 65 at an end portion thereof on the inside in the radial direction and is connected to the internal connection beam 55L at an end portion thereof on the outside in the radial direction. The right detection beam 63 extends in the radial direction of the detection beam 53 adjacent to the right side of the central detection beam 61, is connected to the base end detection beam 64 via the connection portion 65 at an end portion thereof on the inside in the radial direction and is connected to the internal connection beam 55R at an end portion thereof on the outside in the radial direction.

The thus-configured vibrating body 51 has a driven vibration mode, a 1st detection vibration mode, a 2nd detection vibration mode and a 3rd detection vibration mode as vibration modes.

Figure 8:
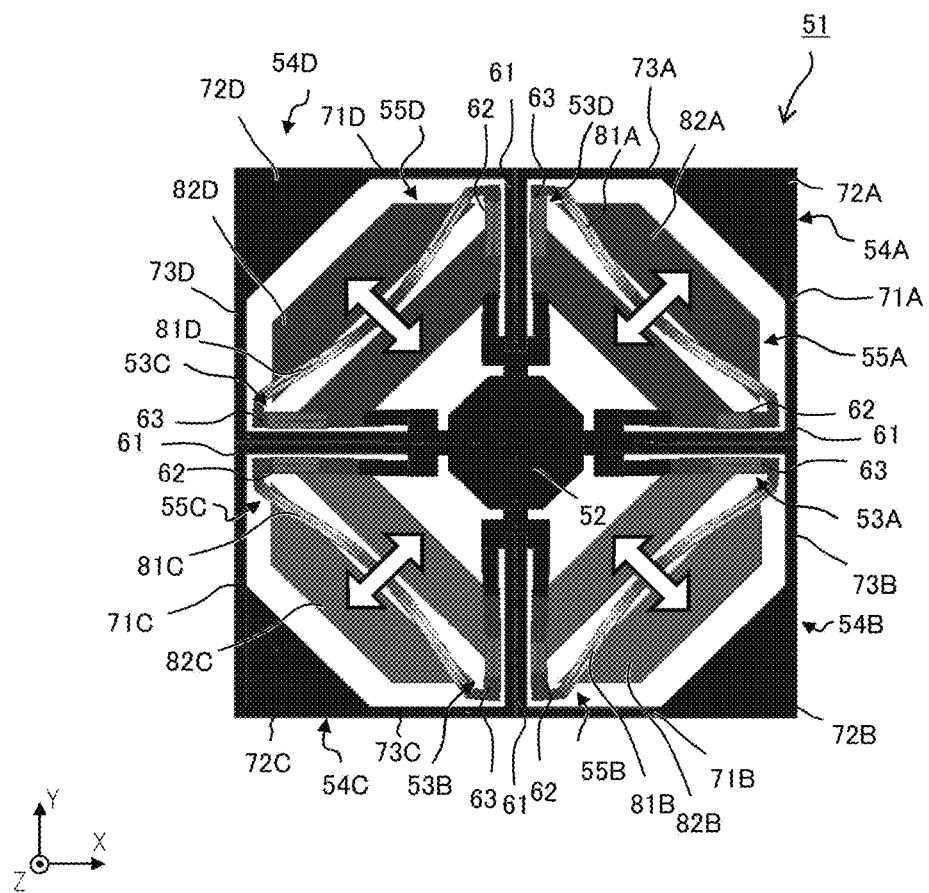
FIG. 8 illustrates a driven vibration mode of the vibrating body according to the 2nd preferred embodiment of the present invention.

FIG. 8 is an X-Y plane plan view illustrating a deformation state in the driven vibration mode of the vibrating body 51.

The driven vibration mode is excited by driving elements, which will be described later, in the angular velocity detection element 50. In the driven vibration mode, the internal connection beams 55A to 55D undergo driven vibration in the same direction as each other so as to alternately bend toward the inside and the outside in the radial directions. That is, the weights 82A to 82D, which are adjacent to each other with the detection beams 53A to 53D therebetween, are displaced in directions so as to have mirror image relationships with each other with the detection beams 53A to 53D acting as boundaries therebetween at the planar surface. At this time, in the end portions of the central detection beams 61 of the detection beams 53A to 53D on the inside in the radial directions, deformation occurs such that a state in which the connection angle between the connected left detection beam 62 and right detection beam 63 widens and a state in which the connection angle between the connected left detection beam 62 and right detection beam 63 narrows alternately and periodically repeatedly occurs. Therefore, forces of approximately the same size are symmetrically applied in opposite directions from the left detection beam 62 and the right detection beam 63 to the end portion of the central detection beam 61 on the inside in the radial direction.

Consequently, in the end portion of the central detection beam 61 on the inside in the radial direction, the force applied from the left detection beam 62 and the force applied from the right detection beam 63 balance each other out and a deformation that would cause the central detection beam 61 to bend within the planar surface is not generated. Thus, the driven vibration is not transmitted to the external connection beams 54A to 54D connected to the outsides of the central detection beams 61 in the radial directions. In addition, the driven vibration is not transmitted to the base end detection beam 64 connected to the inside of the central detection beam 61 in the radial direction. That is, the external connection beams 54A to 54D, the central detection beams 61, the base end detection beams 64 and the central base 52 remain static and energy of the driven vibration does not escape from the central base 52. In addition, even if the support substrate (external structure) to which the central base 52 is fixed deforms or vibrates as a result of receiving a stress, a vibration of the driven vibration mode is not generated in the vibrating body 51 due to the effect of such a deformation or vibration. Therefore, detection sensitivity and detection accuracy are improved. In addition, generation of variations in characteristics is significantly reduced or prevented.

Furthermore, in the driven vibration mode, since only the internal connection beams 55A to 55D undergo driven vibration and the external connection beams 54A to 54D and the central detection beams 61 of the detection beams 53A to 53D are static, just detection vibrations are detected without detecting driven vibrations by detecting vibrations of the external connection beams 54A to 54D and the detection beams 53A to 53D with detection elements, which will be described later. In this way, detection sensitivity and detection accuracy are further improved.

Figure 9:
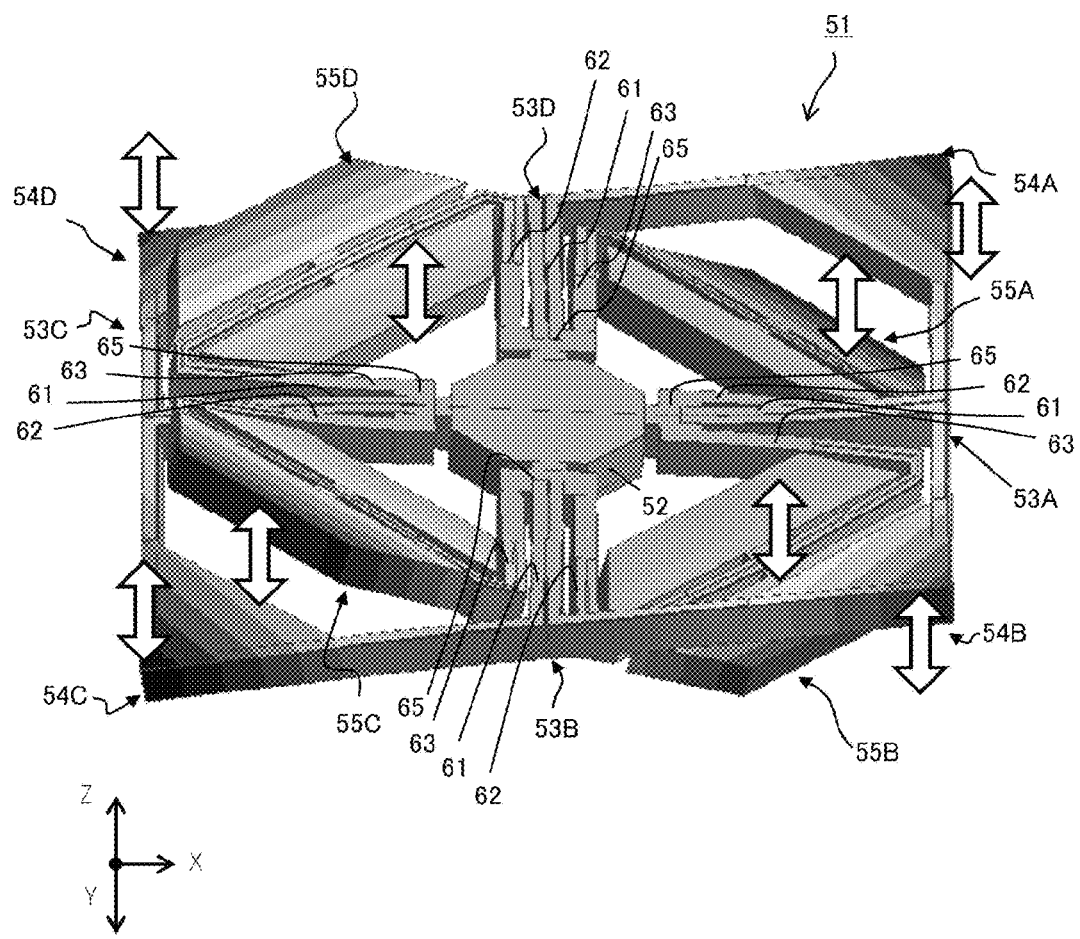
FIG. 9 illustrates a detection vibration mode when an angular velocity is acting around an axis parallel to a planar surface in the vibrating body according to the 2nd preferred embodiment of the present invention.

FIG. 9 is an X-Y plane plan view illustrating a deformation state in a detection vibration mode to detect an angular velocity around an axis parallel to the planar surface of the vibrating body 51 and a case is illustrated in which an angular velocity acts around the Y axis. Although not illustrated here, in the case where an angular velocity acts around the X axis, the deformation state is obtained by rotating the illustrated state by 90° around the Z axis.

The 1st detection vibration mode is excited by an angular velocity around the X axis parallel to the planar surface of the vibrating body 51 and is detected from the vibrating body 51 using detection elements, which will be described later. In addition, the 2nd detection vibration mode is excited by an angular velocity around the Y axis parallel to the planar surface of the vibrating body 51 and is detected separately from the 1st detection vibration mode from the vibrating body 51 using detection elements, which will be described later.

An angular velocity around the X axis or Y axis parallel to the planar surface acts on the vibrating body 51 vibrating in the driven vibration mode and as a result Coriolis forces are generated along the Z axis in the internal connection beams 55A to 55D. The internal connection beams 55A to 55D are displaced along the Z axis by these Coriolis forces.

The directions in which the Coriolis force acts and the directions of displacement along the Z axis are opposite for the internal connection beams 55A to 55D positioned on one side and the internal connection beams 55A to 55D positioned on the other side with the axis around which the angular velocity acts interposed therebetween.

Thus, vibration in the 1st and 2nd detection vibration modes does not cause displacement such that the weights 82A to 82D have mirror image relationships with each other as in the above-described driven vibration mode (non-mirror-image relationships) and therefore the left detection beams 62 and the right detection beams 63 of the detection beams 53A to 53D connected to the internal connection beams 55A to 55D undergo detection vibration so as to bend in the same direction as the connected internal connection beams 55A to 55D. That is, the left detection beam 62 and the right detection beam 63 positioned on the one side and the left detection beam 62 and the right detection beam 63 positioned on the other side with the axis around which the angular velocity acts interposed therebetween undergo detection vibration in opposite directions to each other along the Z axis.

Then, a central detection beam 61 connected between a left detection beam 62 and the right detection beam 63 that are undergoing detection vibration in the same direction as each other undergoes coupled vibration with the detection vibration of the left detection beam 62 and the right detection beam 63, and undergoes detection vibration so as to bend along the Z axis in the opposite direction to the connected left detection beam and right detection beam 63. On the other hand, a central detection beam 61 connected between a left detection beam 62 and a right detection beam 63 that are undergoing detection vibration in opposite directions to each other in the detection beams 53A to 53D undergoes detection vibration so as to twist. As a result, the internal connection beams 55A to 55D and the external connection beams 54A to 54D undergo detection vibration in opposite directions to each other along the Z axis.

Therefore, in the 1st and 2nd detection vibration modes, not only the internal connection beams 55A to 55D, which vibrate in the driven vibration mode, but also the external connection beams 54A to 54D, which are static in the driven vibration mode, undergo detection vibration. Consequently, the vibrations of the external connection beams 54A to 54D are detected using detection elements, which will be described later, and thus it is possible to detect only the detection vibrations without detecting driven vibrations.

In addition, detection vibrations transmitted from the external connection beams 54A to 54D and detection vibrations transmitted from the internal connection beams 55A to 55D are transmitted with opposite phases and therefore cancel each other out in the detection beams 53A to 53D. Thus, detection vibrations transmitted to the central base 52 from the connection portions 65 via the base end detection beams 64 are greatly reduced and the energy of detection vibrations does not escape from the central base 52. In addition, even if the support substrate (external structure) to which the central base is fixed deforms or vibrates as a result of receiving a stress, a detection vibration is not generated in the vibrating body 51 due to the effect of such a deformation or vibration and generation of variations in characteristics is significantly reduced or prevented.

Figure 10:
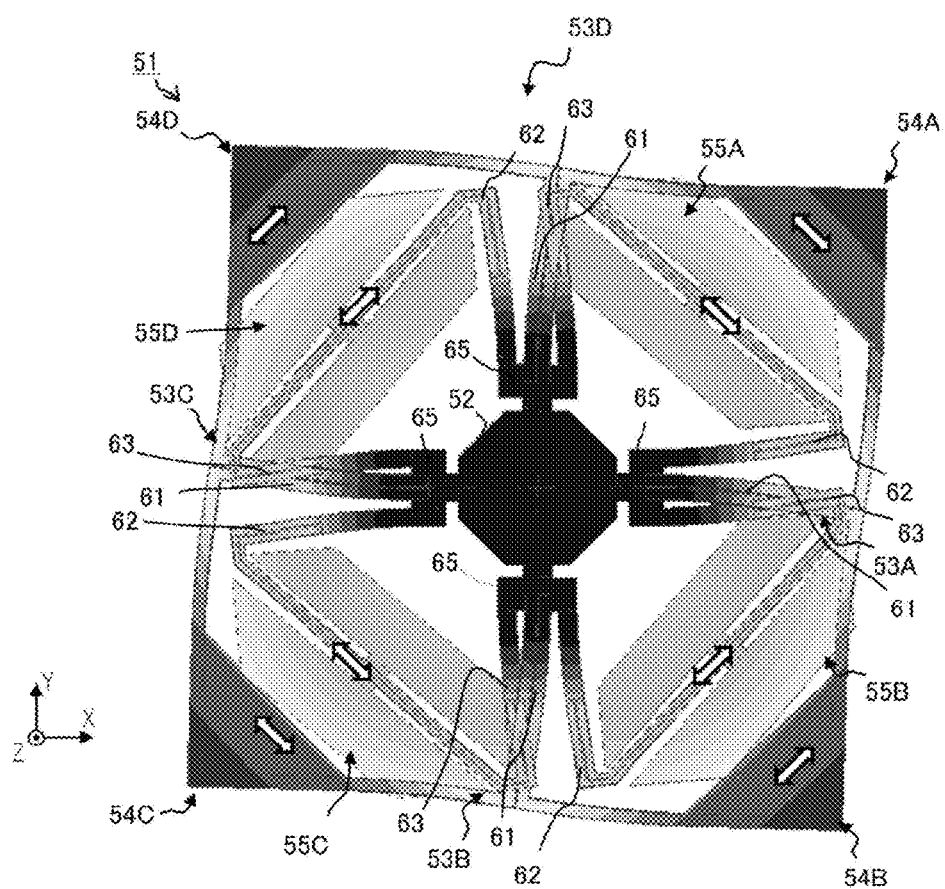
FIG. 10 illustrates a detection vibration mode when an angular velocity is acting around an axis orthogonal to a planar surface in the vibrating body according to the 2nd preferred embodiment of the present invention.

FIG. 10 is an X-Y plane plan view illustrating a deformation state in the 3rd detection vibration mode of the vibrating body 51.

The 3rd detection vibration mode is excited by an angular velocity around the Z axis in the angular velocity detection element 50 and is detected from the vibrating body 51 by using detection elements, which will be described later.

An angular velocity around the Z axis orthogonal to the planar surface acts on the vibrating body 51 vibrating in the driven vibration mode and as a result Coriolis forces in a direction orthogonal to the axis around which the angular velocity acts and to the direction of the driven vibration are generated in internal connection beams 55A to 55D, which are undergoing driven vibration along the axis orthogonal to the axis around which the angular velocity acts. A vibration of the 3rd detection vibration mode is excited in the vibrating body 51 by the Coriolis forces.

The directions of driven vibration in the adjacent internal connection beams 55A to 55D are shifted by 90° from each other and therefore the directions in which the Coriolis forces act on the internal connection beams 55A to 55D are shifted by 90° from each other and the internal connection beams 55A to 55D undergo detection vibration in the same direction as each other so as to alternately rotate in a clockwise direction around the Z axis and in an anti-clockwise direction around the Z axis in the planar surface (X-Y plane). Thus, vibration in the 3rd detection vibration mode does not cause displacement such that the weights 82A to 82D have mirror image relationships with each other as in the above-described driven vibration mode (non-mirror-image relationships) and therefore the left detection beams 62 and the right detection beams 63 of the detection beams 53A to 53D connected to the internal connection beams 55A to 55D undergo detection vibration in the same direction as the internal connection beams 55A to 55D so as to alternately bend in the right direction and the left direction with respect to the radial direction.

In each of the detection beams 53A to 53D, the central detection beam 61 is connected between the left detection beam and the right detection beam 63. Therefore, the central detection beams 61 of the detection beams 53A to 53D undergo coupled vibration with the detection vibrations of the respective left detection beams 62 and the right detection beams of the detection beams 53A to 53D and undergo detection vibration in the opposite direction to the respective left detection beams 62 and the right detection beams 63. Thus, the external connection beams 54A to 54D connected between the central detection beams 61 of the detection beams 53A to 53D undergo detection vibration in the same direction as the central detection beams 61 of the detection beams 53A to 53D.

Thus, in the 3rd detection vibration mode, the external connection beams 54A to 54D and the internal connection beams 55A to 55D undergo detection vibration in opposite directions to each other so as to alternately rotate in a clockwise direction around the Z axis and in an anti-clockwise direction around the Z axis in the planar surface (X-Y plane). Therefore, not only the internal connection beams 55A to 55D, which vibrate in the driven vibration mode, but also the external connection beams 54A to 54D, which are static in the driven vibration mode, undergo detection vibration and vibrations of the external connection beams 54A to 54D are detected by detection elements, which will be described later, and thus it is possible to detect only the detection vibrations without detecting the driven vibrations.

In addition, detection vibrations transmitted from the external connection beams 54A to 54D and detection vibrations transmitted from the internal connection beams 55A to 55D are transmitted with opposite phases and therefore cancel each other out in the detection beams 53A to 53D. Thus, detection vibrations transmitted to the central base 52 from the connection portions 65 are greatly reduced and the energy of detection vibrations does not escape from the central base 52. In addition, even if the support substrate (external structure) to which the central base 52 is fixed deforms or vibrates as a result of receiving a stress, a vibration of the 3rd detection vibration mode is not generated in the vibrating body 51 due to the effect of such a deformation or vibration. Therefore, the detection sensitivity and detection accuracy are further improved and generation of variations in characteristics is significantly reduced or prevented.

As has been described above, in the driven vibration mode, the 1st detection vibration mode, the 2nd detection vibration mode and the 3rd detection vibration mode of the vibrating body 51, transmission of vibration to the central base 52 is closed, vibration energy does not escape from the central base 52, and even if the support substrate (external structure) to which the central base 52 is fixed deforms or vibrates as a result of receiving a stress, a vibration of each vibration mode is not generated in the vibrating body 51 due to the effect of such a deformation or vibration. Therefore, detection sensitivity and detection accuracy are greatly improved. In addition, even if there is a change in stress or temperature in the support substrate (external structure), generation of variations in characteristics is significantly reduced or prevented.

Next, description will be given of a configuration in which the vibrating body 51 is provided with piezoelectric elements as driving elements and detection elements in the angular velocity detection element 50 according to the 2nd preferred embodiment. An electrostatic force or an electrostatic capacitance may be used as the driving elements and the detection elements instead of piezoelectric elements, for example.

Figure 11:
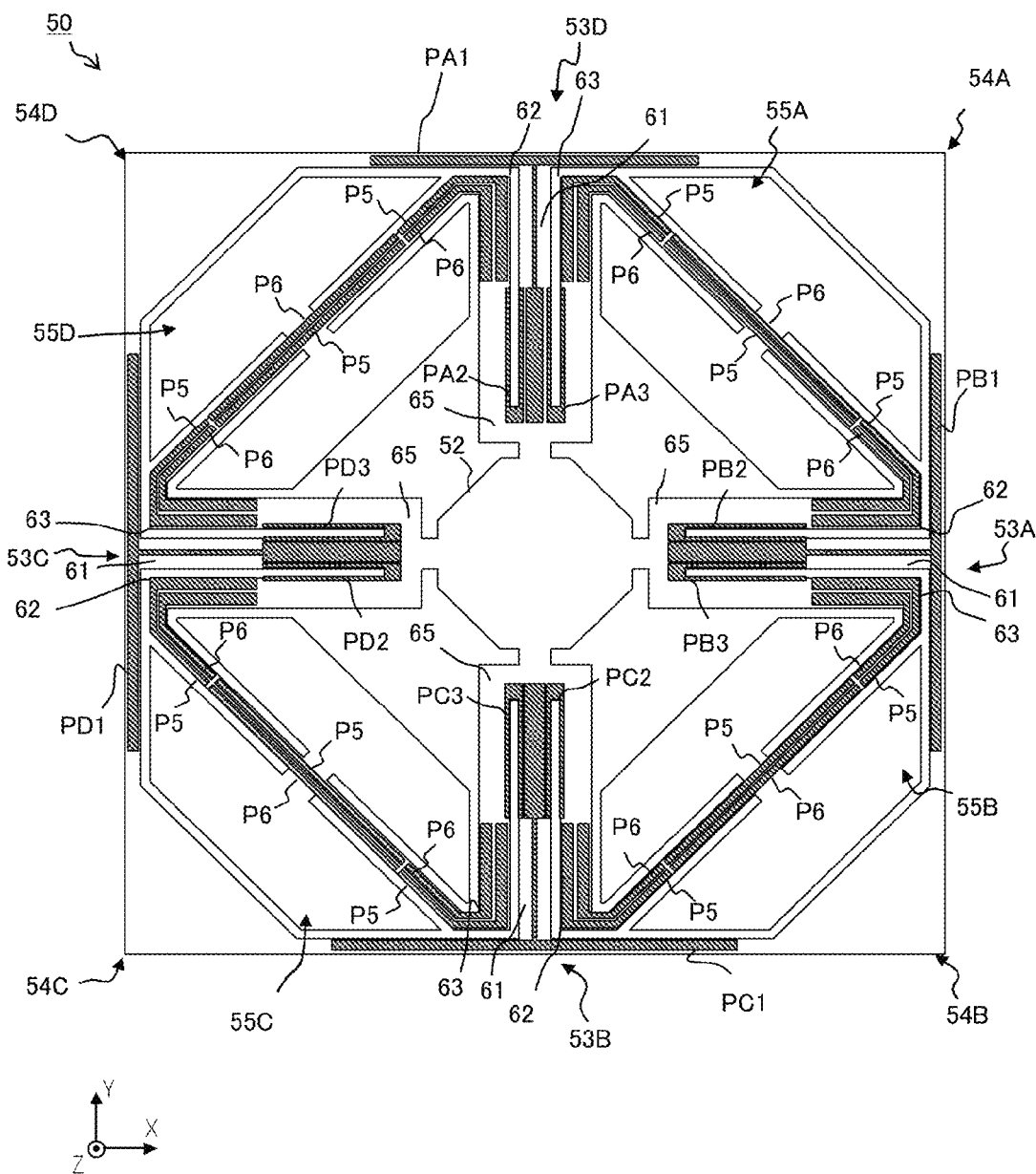
FIG. 11 illustrates piezoelectric elements of the angular velocity detection element according to the 2nd preferred embodiment of the present invention.

FIG. 11 is an X-Y plane plan view of the angular velocity detection element 50.

The angular velocity detection element 50 includes detection piezoelectric elements PA1, PA2, PA3, PB1, PB2, PB3, PC1, PC2, PC3, PD1, PD2 and PD3 and driving piezoelectric elements P5 and P6.

More specifically, the driving piezoelectric elements P5 are arranged on the outside in the radial direction in the vicinity of an end portion on the negative X axis direction side, on the inside in the radial direction in the vicinity of the center, and on the outside in the radial direction in the vicinity of an end portion on the positive X axis direction side in the internal connection beam 55A. On the other hand, the driving piezoelectric elements P6 are arranged on the inside in the radial direction in the vicinity of an end portion on the negative X axis direction side, on the outside in the radial direction in the vicinity of the center, and on the inside in the radial direction in the vicinity of an end portion on the positive X axis direction side in the internal connection beam 55A.

In addition, the driving piezoelectric elements P5 are arranged on the outside in the radial direction in the vicinity of an end portion on the negative X axis direction side, on the inside in the radial direction in the vicinity of the center, and on the outside in the radial direction in the vicinity of an end portion on the positive X axis direction side in the internal connection beam 55B. On the other hand, the driving piezoelectric elements P6 are arranged on the inside in the radial direction in the vicinity of an end portion on the negative X axis direction side, on the outside in the radial direction in the vicinity of the center, and on the inside in the radial direction in the vicinity of an end portion on the positive X axis direction side in the internal connection beam 55B.

In addition, the driving piezoelectric elements P5 are arranged on the outside in the radial direction in the vicinity of an end portion on the negative X axis direction side, on the inside in the radial direction in the vicinity of the center, and on the outside in the radial direction in the vicinity of an end portion on the positive X axis direction side in the internal connection beam 55C. On the other hand, the driving piezoelectric elements P6 are arranged on the inside in the radial direction in the vicinity of an end portion on the negative X axis direction side, on the outside in the radial direction in the vicinity of the center, and on the inside in the radial direction in the vicinity of an end portion on the positive X axis direction side in the internal connection beam 55C.

In addition, the driving piezoelectric elements P5 are arranged on the outside in the radial direction in the vicinity of an end portion on the negative X axis direction side, on the inside in the radial direction in the vicinity of the center, and on the outside in the radial direction in the vicinity of an end portion on the positive X axis direction side in the internal connection beam 55D. On the other hand, the driving piezoelectric elements P6 are arranged on the inside in the radial direction in the vicinity of an end portion on the negative X axis direction side, on the outside in the radial direction in the vicinity of the center, and on the inside in the radial direction in the vicinity of an end portion on the positive X axis direction side in the internal connection beam 55D.

The driving piezoelectric elements P5 and the driving piezoelectric elements P6 are applied with alternating current voltages set with opposite phases. Thus, a vibration of the driven vibration mode illustrated in FIG. 8 is generated in the vibrating body 51.

The arrangement of the driving piezoelectric elements P5 and P6 illustrated here is just an example and the arrangement of the driving piezoelectric elements P5 and P6 may be any arrangement so long as the arrangement can cause a vibration of the driven vibration mode illustrated in FIG. 8 to be generated. In addition, here, a monitor piezoelectric element and a dummy piezoelectric element are not provided, but any of the driving piezoelectric elements P5 and P6 may be replaced with a monitor piezoelectric element and a dummy piezoelectric element.

The detection piezoelectric elements PA1, PA2, PA3, PB1, PB2, PB3, PC1, PC2, PC3, PD1, PD2 and PD3 are provided on the detection beams 53A to 53D and the external connection beams 54A to 54D and are connected to a detection circuit (differential amplifier circuit) via wiring electrodes and land electrodes, which are not illustrated.

The detection piezoelectric element PA1 and the detection piezoelectric element PC1 are configured to detect an angular velocity acting around the X axis. The detection piezoelectric element PA1 is substantially T-shaped and is provided on the detection beam 53D, the external connection beam 54D and the external connection beam 54A. The detection piezoelectric element PA1 extends in the radial direction on the central detection beam 61 of the detection beam 53D and extends parallel to the X axis on the external connection beam 54D and the external connection beam 54A. The detection piezoelectric element PC1 is substantially T-shaped and is provided on the detection beam 53B, the external connection beam 54B and the external connection beam 54C. The detection piezoelectric element PC1 extends in the radial direction on the central detection beam 61 of the detection beam 53B and extends parallel to the X axis on the external connection beam 54B and the external connection beam 54C.

Therefore, in the 1st detection vibration mode generated by an angular velocity acting around the X axis, when the external connection beam 54D and the external connection beam 54A are displaced in the positive direction along the Z axis and the external connection beam 54B and the external connection beam 54C are displaced in the negative direction along the Z axis, the detection piezoelectric element PA1 contracts and the detection piezoelectric element PC1 extends. Conversely, when the external connection beam 54D and the external connection beam 54A are displaced in the negative direction along the Z axis and the external connection beam 54B and the external connection beam 54C are displaced in the positive direction along the Z axis, the detection piezoelectric element PA1 extends and the detection piezoelectric element PC1 contracts. Thus, voltages of opposite polarities are generated in the detection piezoelectric element PA1 and the detection piezoelectric element PC1.

In the 2nd detection vibration mode generated by an angular velocity acting around the Y axis, only the detection beams 53D and 53B are deformed so as to be twisted and a change in voltage is not generated in the detection piezoelectric elements PA1 and PC1. In addition, in the 3rd detection vibration mode generated by an angular velocity acting around the Z axis, an extension region and a contraction region are provided in the detection piezoelectric elements PA1 and PC1 and a change in voltage is not generated in the detection piezoelectric elements PA1 and PC1.

Therefore, by subjecting the voltage of the detection piezoelectric element PA1 and the voltage of the detection piezoelectric element PC1 to differential amplification, the angular velocity around the X axis is detected without detecting the angular velocity around the Y axis and the angular velocity around the Z axis.

The detection piezoelectric element PB1 and the detection piezoelectric element PD1 are configured to detect an angular velocity acting around the Y axis. The detection piezoelectric element PB1 is substantially T-shaped and is provided on the detection beam 53A, the external connection beam 54A and the external connection beam 54B. The detection piezoelectric element PB1 extends in the radial direction on the central detection beam 61 of the detection beam 53A and extends parallel to the Y axis on the external connection beam 54A and the external connection beam 54B. The detection piezoelectric element PD1 is substantially T-shaped and is provided on the detection beam 53C, the external connection beam 54C and the external connection beam 54D. The detection piezoelectric element PD1 extends in the radial direction on the central detection beam 61 of the detection beam 53C and extends parallel to the Y axis on the external connection beam 54C and the external connection beam 54D.

Therefore, in the 2nd detection vibration mode generated by an angular velocity acting around the Y axis, when the external connection beam 54A and the external connection beam 54B are displaced in the positive direction along the Z axis and the external connection beam 54C and the external connection beam 54D are displaced in the negative direction along the Z axis, the detection piezoelectric element PB1 contracts and the detection piezoelectric element PD1 extends. Conversely, when the external connection beam 54A and the external connection beam 54B are displaced in the negative direction along the Z axis and the external connection beam 54C and the external connection beam 54D are displaced in the positive direction along the Z axis, the detection piezoelectric element PB1 extends and the detection piezoelectric element PD1 contracts. Thus, voltages of opposite polarities are generated in the detection piezoelectric element PB1 and the detection piezoelectric element PD1.

In the 1st detection vibration mode generated by an angular velocity acting around the X axis, only the detection beams 53A and 53C are deformed so as to be twisted and a change in voltage is not generated in the detection piezoelectric elements PD1 and PB1. In addition, in the 3rd detection vibration mode generated by an angular velocity acting around the Z axis, an extension region and a contraction region are formed in the detection piezoelectric elements PB1 and PD1 and a change in voltage is not generated in the detection piezoelectric elements PB1 and PD1.

Therefore, by subjecting the voltage of the detection piezoelectric element PB1 and the voltage of the detection piezoelectric element PD1 to differential amplification, the angular velocity around the Y axis is detected without detecting the angular velocity around the X axis and the angular velocity around the Z axis.

The detection piezoelectric elements PA2, PB2, PC2 and PD2 and the detection piezoelectric elements PA3, PB3, PC3 and PD3 are configured to detect an angular velocity acting around the Z axis.

The detection piezoelectric element PA2 is substantially U-shaped and is arranged to extend from the left detection beam 62 to the central detection beam 61 of the detection beam 53D and extends in the radial direction of the detection beam 53D on the left detection beam 62 and the central detection beam 61. The detection piezoelectric element PA3 is substantially U-shaped and is arranged so as to extend from the right detection beam 63 to the central detection beam 61 of the detection beam 53D and extends in the radial direction of the detection beam 53D on the right detection beam 63 and the central detection beam 61.

The detection piezoelectric element PB2 is substantially U-shaped and is arranged to extend from the left detection beam 62 to the central detection beam 61 of the detection beam 53A and extends in the radial direction of the detection beam 53A on the left detection beam 62 and the central detection beam 61. The detection piezoelectric element PB3 is substantially U-shaped and is arranged so as to extend from the right detection beam 63 to the central detection beam 61 of the detection beam 53A and extends in the radial direction of the detection beam 53A on the right detection beam 63 and the central detection beam 61.

The detection piezoelectric element PC2 is substantially U-shaped and is arranged so as to extend from the left detection beam 62 to the central detection beam 61 of the detection beam 53B and extends in the radial direction of the detection beam 53B on the left detection beam 62 and the central detection beam 61. The detection piezoelectric element PC3 is substantially U-shaped and is arranged so as to extend from the right detection beam 63 to the central detection beam 61 of the detection beam 53B and extends in the radial direction of the detection beam 53B on the right detection beam 63 and the central detection beam 61.

The detection piezoelectric element PD2 is substantially U-shaped and is arranged so as to extend from the left detection beam 62 to the central detection beam 61 of the detection beam 53C and extends in the radial direction of the detection beam 53C on the left detection beam 62 and the central detection beam 61. The detection piezoelectric element PD3 is substantially U-shaped and is arranged so as to extend from the right detection beam 63 to the central detection beam 61 of the detection beam 53C and extends in the radial direction of the detection beam 53C on the right detection beam 63 and the central detection beam 61.

Therefore, in the 3rd detection vibration mode generated by an angular velocity acting around the Z axis, the detection piezoelectric elements PA3, PB3, PC3 and PD3 contract when the detection piezoelectric elements PA2, PB2, PC2 and PD2 extend, the detection piezoelectric elements PA3, PB3, PC3 and PD3 extend when the detection piezoelectric elements PA2, PB2, PC2 and PD2 contract, and voltages of opposite polarities are generated in the detection piezoelectric elements PA2, PB2, PC2 and PD2 and the detection piezoelectric elements PA3, PB3, PC3 and PD3.

On the other hand, in the 1st detection vibration mode and the 2nd detection vibration mode, voltages of opposite polarities are generated in detection piezoelectric elements provided in one region and another region between which the axis around which the angular velocity acts is interposed. Therefore, when the voltage at an electrode to which the detection piezoelectric elements PA2, PB2, PC2 and PD2 are connected and the voltage at an electrode to which the detection piezoelectric elements PA3, PB3, PC3 and PD3 are connected are subjected to differential amplification, an angular velocity around the Z axis is detected without detecting an angular velocity around the X axis and an angular velocity around the Y axis.

The angular velocity detection element 50 according to the 2nd preferred embodiment of the present invention is configured as described above and is capable of separately detecting angular velocities around three axes of an orthogonal coordinates system. A detection vibration of the vibrating body is detected without detecting a driven vibration of the vibrating body 51 and generation of an unwanted detection signal is prevented. In addition, driven vibrations and detection vibrations of the vibrating body 51 are confined to the external connection beams 54A to 54D, the internal connection beams 55A to 55D and the detection beams 53A to 53D and do not escape to the support substrate via the central base 52. Therefore, the vibration efficiencies of driven vibration and detection vibration are high and high detection sensitivity and detection accuracy are realized. In addition, the effect of stress and vibration acting on the support substrate is not transmitted to the driven vibration and the detection vibration and as a result of this as well high detection sensitivity and detection accuracy are realized, and an angular velocity detection element 50 having little variation in characteristics is provided.

Next, an angular velocity detection element according to a 3rd preferred embodiment of the present invention will be described. The angular velocity detection element according to the 3rd preferred embodiment is configured so as to cause the internal connection beams to undergo driven vibration and detection vibration and so that driven vibrations and detection vibrations are not generated in the external connection beams in the vibrating body. Alternatively, a configuration may be adopted in which only the external connection beams and not the internal connection beams are caused to undergo driven vibration and detection vibration and in which driven vibrations and detection vibrations are not generated in the internal connection beams in the vibrating body.

Figure 12A:
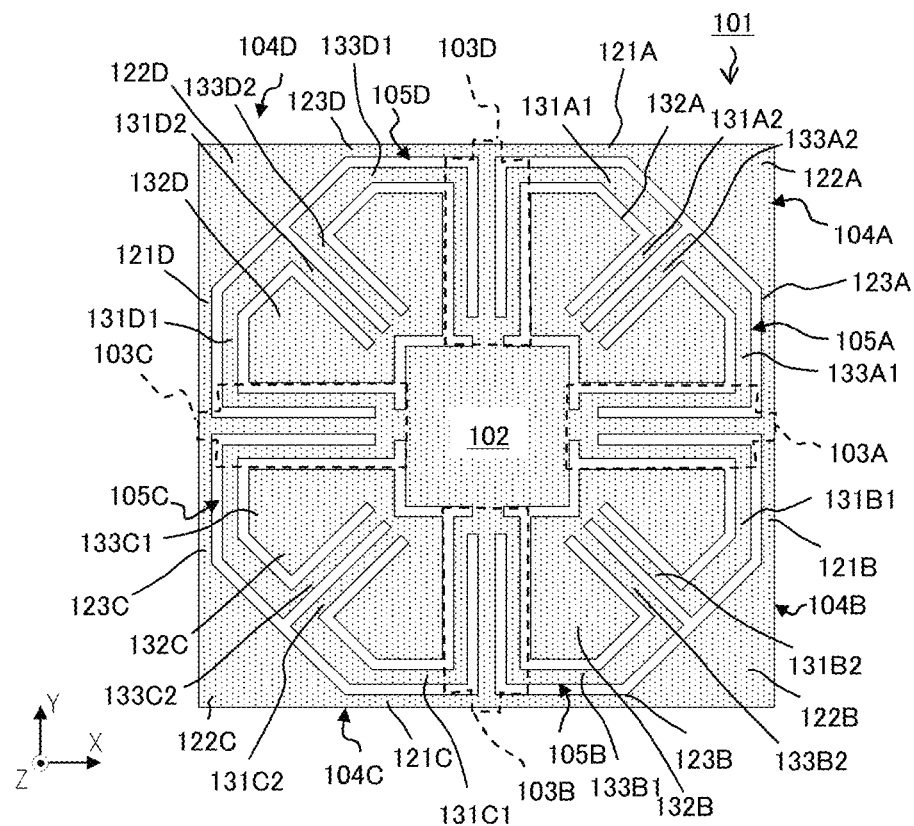
FIGS. 12A and 12B illustrate a vibrating body of an angular velocity detection element according to a 3rd preferred embodiment of the present invention.

FIG. 12A is an X-Y plane plan view illustrating a vibrating body 101 of an angular velocity detection element 100 according to the 3rd preferred embodiment of the present invention.

The vibrating body 101 is supported by a support substrate, which is not illustrated. The vibrating body 101 includes a planar surface that is parallel to the X axis and the Y axis on the positive direction side of the Z axis and on the negative direction side of the Z axis. The vibrating body 101 preferably has a 4-fold rotationally symmetrical shape when looking at the planar surface. The vibrating body 101 includes a central base 102, detection beams 103A, 103B, 103C and 103D, external connection beams 104A, 104B, 104C and 104D and internal connection beams 105A, 105B, 105C and 105D.

The central base 102, the detection beams 103A, 103B, 103C and 103D and the external connection beams 104A, 104B, 104C and 104D have substantially the same configurations as in the above-described 2nd preferred embodiment, and the main difference from the configuration of the above-described 2nd preferred embodiment lies in the internal connection beams 105A, 105B, 105C and 105D.

The external connection beam 104A includes a connection beam 121A, a weight 122A and a connection beam 123A. The external connection beam 104B includes a connection beam 121B, a weight 122B and a connection beam 123B. The external connection beam 104C includes a connection beam 121C, a weight 122C and a connection beam 123C. The external connection beam 104D includes a connection beam 121D, a weight 122D and a connection beam 123D.

Figure 12B:
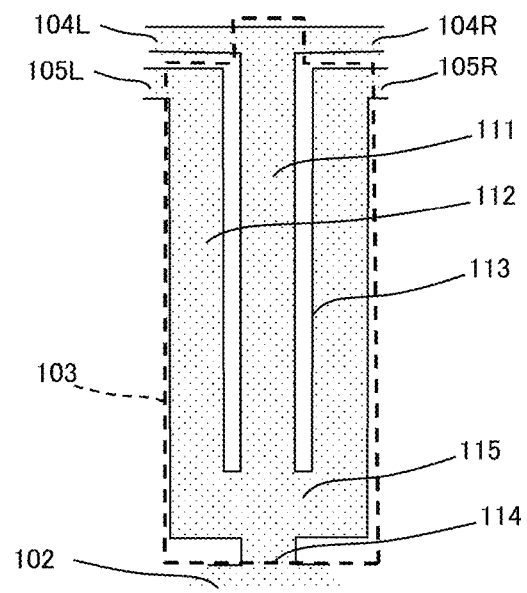

FIG. 12B is an X-Y plane plan view illustrating the structure in the vicinity of the detection beams 103A to 103D. In FIG. 12B, the reference numerals of the detection beams 103A to 103D have been changed to that of a detection beam 103. In addition, reference numerals of external connection beams 104A to 104D have been changed to that of an external connection beam 104L for one positioned to the left of the detection beam 103 and to that of an external connection beam 104R for one positioned to the right of the detection beam 103. In addition, reference numerals of internal connection beams 105A to 105D have been changed to that of an internal connection beam 105L for one positioned to the left of the detection beam 103 and to that of an internal connection beam 105R for one positioned to the right of the detection beam 103. The detection beam 103 includes a central detection beam 111, a left detection beam 112, a right detection beam 113, a base end detection beam 114 and a connection portion 115.

The internal connection beam 105A is arranged in a 45° direction with respect to the central base 102 when looking at the planar surface and includes a connection beam 131A1, a connection beam 131A2, a weight 132A, a connection beam 133A1 and a connection beam 133A2. An end portion of the connection beam 131A1 on the negative X axis direction side is orthogonally connected to the detection beam 103D, the center of the connection beam 131A1 is bent, and an end portion of the connection beam 131A1 on the positive X axis direction side is orthogonally connected to the connection beam 131A2. The connection beam 131A2 extends in a radial direction, is connected to the connection beam 131A1 at an end portion thereof on the outside in the radial direction and is connected to the weight 132A at an end portion thereof on the inside in the radial direction. An end portion of the connection beam 133A1 on the negative Y axis direction side is orthogonally connected to the detection beam 103A, the center of the connection beam 133A1 is bent, and an end portion of the connection beam 133A1 on the positive Y axis direction side is orthogonally connected to the connection beam 133A2. The connection beam 133A2 extends in a radial direction, is connected to the connection beam 133A1 at an end portion thereof on the outside in the radial direction and is connected to the weight 132A at an end portion thereof on the inside in the radial direction. The weight 132A is connected between the connection beam 131A2 and the connection beam 133A2.

The internal connection beam 105B is arranged in a 135° direction with respect to the central base 102 when looking at the planar surface and includes a connection beam 131B1, a connection beam 131B2, a weight 132B, a connection beam 133B1 and a connection beam 133B2. An end portion of the connection beam 131B1 on the positive Y axis direction side is orthogonally connected to the detection beam 103A, the center of the connection beam 131B1 is bent, and an end portion of the connection beam 131B1 on the negative Y axis direction side is orthogonally connected to the connection beam 131B2. The connection beam 131B2 extends in a radial direction, is connected to the connection beam 131B1 at an end portion thereof on the outside in the radial direction and is connected to the weight 132B at an end portion thereof on the inside in the radial direction.

An end portion of the connection beam 133B1 on the negative X axis direction side is orthogonally connected to the detection beam 103B, the center of the connection beam 133B1 is bent, and an end portion of the connection beam 133B1 on the positive X axis direction side is orthogonally connected to the connection beam 133B2. The connection beam 133B2 extends in a radial direction, is connected to the connection beam 133B1 at an end portion thereof on the outside in the radial direction and is connected to the weight 132B at an end portion thereof on the inside in the radial direction. The weight 132B is connected between the connection beam 131B2 and the connection beam 133B2.

The internal connection beam 105C is arranged in a 225° direction with respect to the central base 102 when looking at the planar surface and includes a connection beam 131C1, a connection beam 131C2, a weight 132C, a connection beam 133C1 and a connection beam 133C2. An end portion of the connection beam 131C1 on the positive X axis direction side is orthogonally connected to the detection beam 103B, the center of the connection beam 131C1 is bent, and an end portion of the connection beam 131C1 on the negative X axis direction side is orthogonally connected to the connection beam 131C2. The connection beam 131C2 extends in a radial direction, is connected to the connection beam 131C1 at an end portion thereof on the outside in the radial direction and is connected to the weight 132C at an end portion thereof on the inside in the radial direction.

An end portion of the connection beam 133C1 on the positive Y axis direction side is orthogonally connected to the detection beam 103C, the center of the connection beam 133C1 is bent, and an end portion of the connection beam 133C1 on the negative Y axis direction side is orthogonally connected to the connection beam 133C2. The connection beam 133C2 extends in a radial direction, is connected to the connection beam 133C1 at an end portion thereof on the outside in the radial direction and is connected to the weight 132C at an end portion thereof on the inside in the radial direction. The weight 132C is connected between the connection beam 131C2 and the connection beam 133C2.

The internal connection beam 105D is arranged in a 315° direction with respect to the central base 102 when looking at the planar surface and includes a connection beam 131D1, a connection beam 131D2, a weight 132D, a connection beam 133D1 and a connection beam 133D2. An end portion of the connection beam 131D1 on the negative Y axis direction side is orthogonally connected to the detection beam 103C, the center of the connection beam 131D1 is bent, and an end portion of the connection beam 131D1 on the positive Y axis direction side is orthogonally connected to the connection beam 131D2. The connection beam 131D2 extends in a radial direction, is connected to the connection beam 131D1 at an end portion thereof on the outside in the radial direction and is connected to the weight 132D at an end portion thereof on the inside in the radial direction. An end portion of the connection beam 133D1 on the positive X axis direction side is orthogonally connected to the detection beam 103D, the center of the connection beam 133D1 is bent, and an end portion of the connection beam 133D1 on the negative X axis direction side is orthogonally connected to the connection beam 133D2. The connection beam 133D2 extends in a radial direction, is connected to the connection beam 133D1 at an end portion thereof on the outside in the radial direction and is connected to the weight 132D at an end portion thereof on the inside in the radial direction. The weight 132D is connected between the connection beam 131D2 and the connection beam 133D2.

The thus-configured vibrating body 101 has a driven vibration mode, a 1st detection vibration mode, a 2nd detection vibration mode and a 3rd detection vibration mode as vibration modes.

Figure 13:
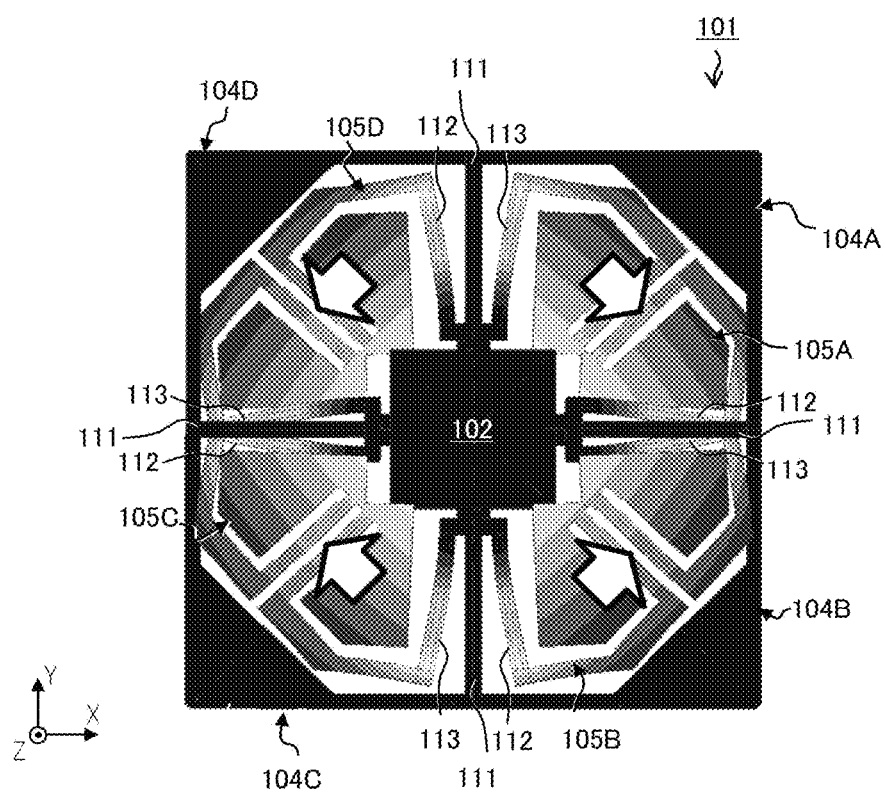
FIG. 13 illustrates a driven vibration mode of the vibrating body according to the 3rd preferred embodiment of the present invention.

FIG. 13 is an X-Y plane plan view illustrating a deformation state in the driven vibration mode of the vibrating body 101.

The driven vibration mode is excited by driving elements, which will be described later, in the angular velocity detection element 100. In the driven vibration mode, the internal connection beams 105A to 105D undergo driven vibration so as to alternately rotate in an anti-clockwise direction and a clockwise direction around an axis (around the Z axis) orthogonal to the planar surface. At this time, the adjacent internal connection beams 105A to 105D rotate in opposite directions to each other. Thus, in the end portions of the central detection beams 111 of the detection beams 103A to 103D on the inside in the radial directions, deformation occurs such that a state in which the connection angle between the connected left detection beam 112 and right detection beam 113 widens and a state in which the connection angle between the connected left detection beam 112 and right detection beam 113 narrows alternately and periodically repeatedly occur. Therefore, forces of approximately the same size are symmetrically applied in opposite directions from the left detection beam 112 and the right detection beam 113 to the end portion of the central detection beam 111 on the inside in the radial direction.

Consequently, in the end portion of the central detection beam 111 on the inside in the radial direction, the force applied from the left detection beam 112 and the force applied from the right detection beam 113 balance each other out and a deformation that would cause the central detection beam 111 to bend within the planar surface is not generated. Thus, the driven vibration is not transmitted to the external connection beams 104A to 104D connected to the outsides of the central detection beams 111 in the radial directions. In addition, the driven vibration is not transmitted to the base end detection beams and the central base 102 connected to the insides of the central detection beams 111 in the radial direction and energy of the driven vibration does not escape from the central base 102. In addition, even if the support substrate (external structure) to which the central base 102 is fixed deforms or vibrates as a result of receiving a stress, a vibration of the driven vibration mode is not generated in the vibrating body 101 due to the effect of such a deformation or vibration. Therefore, detection sensitivity and detection accuracy are improved. In addition, generation of variations in characteristics is significantly reduced or prevented.

Next, detection vibration modes of the vibrating body 101 will be described. The vibrating body 101 has a 1st detection vibration mode, a 2nd detection vibration mode and a 3rd detection vibration mode. The 1st detection vibration mode is a vibration mode to detect an angular velocity around the Y axis parallel to the planar surface and exhibits a vibration state accompanying displacement along the Z-axis similarly to the 1st detection vibration mode illustrated in FIG. 9 in the 2nd preferred embodiment. In addition, the 2nd detection vibration mode is a vibration mode to detect an angular velocity around the X axis parallel to the planar surface and exhibits a vibration state accompanying displacement along the Z-axis similarly to the 2nd detection vibration mode described in the 2nd preferred embodiment. On the other hand, the 3rd detection vibration mode is a vibration mode to detect an angular velocity around the Z axis orthogonal to the planar surface and the vibration state thereof is very different from that of the 3rd detection vibration mode described in the 2nd preferred embodiment.

Figure 14A:
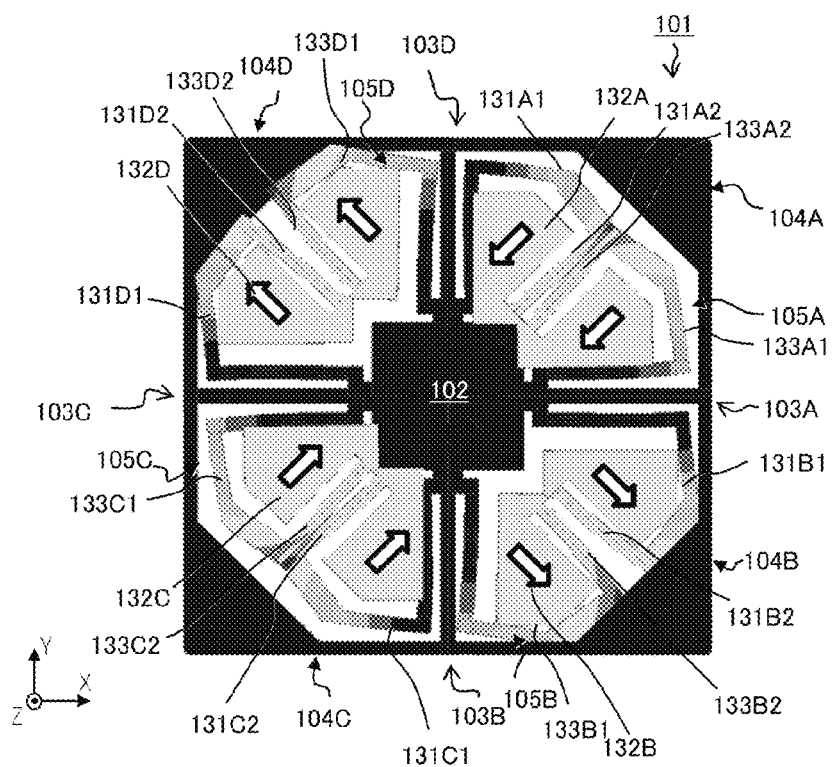
FIGS. 14A and 14B illustrate a detection vibration mode when an angular velocity is acting around an axis orthogonal to a planar surface in the vibrating body according to the 3rd preferred embodiment of the present invention.
Figure 14B:
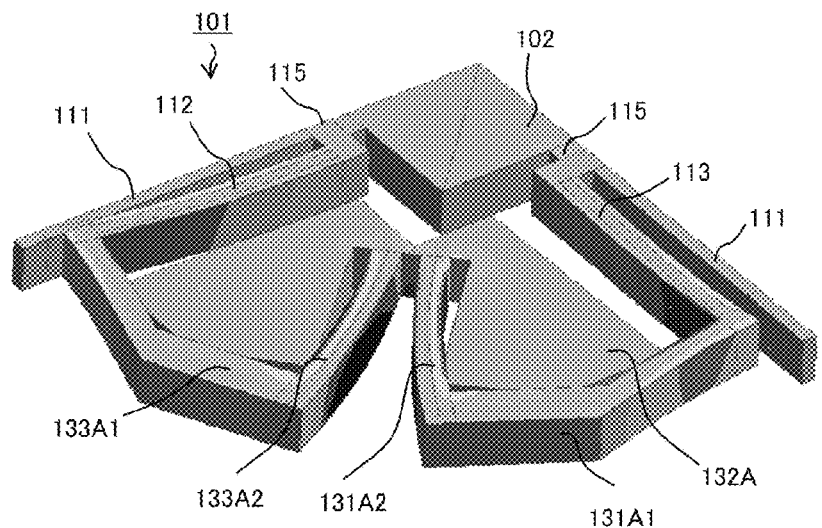

FIG. 14A is an X-Y plane plan view illustrating a deformation state in the 3rd detection vibration mode of the vibrating body 101 and FIG. 14B is a perspective view illustrating a portion of the vibrating body 101 in an enlarged manner.

The 3rd detection vibration mode is excited by an angular velocity around the Z axis in the angular velocity detection element 100 and is detected from the vibrating body 101 by using detection elements, which will be described later. An angular velocity around the Z axis orthogonal to the planar surface acts on the vibrating body 101 vibrating in the driven vibration mode and as a result Coriolis forces in a direction (radial direction) orthogonal to the axis around which the angular velocity acts and to the direction of the driven vibration are generated in internal connection beams 105A to 105D, which are undergoing driven vibration around the Z axis. A vibration of the 3rd detection vibration mode is excited in the vibrating body 101 by the Coriolis forces.

The adjacent weights 132A to 132D of the internal connection beams 105A to 105D rotate in opposite directions around the Z axis due to the driven vibration and therefore the adjacent weights 132A to 132D are displaced in opposite directions along the radial directions by the action of the Coriolis forces. That is, the weights 132B and 132D are displaced toward the outside in the radial directions when the weights 132A and 132C are displaced toward the inside in the radial directions and the weights 132B and 132D are displaced toward the inside in the radial directions when the weights 132A and 132C are displaced toward the outside in the radial directions.

Then, the connection beams 131A2 to 131D2 and the connection beams 133A2 to 133D2 connected to the weights 132A to 132D bend such that the spaces therebetween open and close. More specifically, the connection beams 131A2 to 131D2 and the connection beams 133A2 to 133D2 bend so that the spaces therebetween open when the weights 132A to 132D are displaced toward the outside in the radial directions and the connection beams 131A2 to 131D2 and the connection beams 133A2 to 133D2 bend so that the spaces therebetween close when the weights 132A to 132D are displaced toward the inside in the radial directions.

In addition, the connection beams 131A1 to 131D1 and 133A1 to 133D1 to which the connection beams 131A2 to 131D2 and 133A2 to 133D2 are connected bend such that the connection portions between the connection beams 131A2 to 131D2 and 133A2 to 133D2 bend so as to be displaced toward the inside and the outside in the radial directions.

Then, vibration of the weights 132A to 132D is absorbed by the bending of the connection beams 131A2 to 131D2 and 133A2 to 133D2 and the connection beams 131A1 to 131D1 and 133A1 to 133D1 and the detection vibrations of the weights 132A to 132D are confined to the internal connection beams 105A to 105D. That is, the detection vibrations of the weights 132A to 132D are not transmitted to the central base 102 and the external connection beams 104A to 104D via the detection beams 103A to 103D.

Thus, detection vibrations transmitted to the central base 102 from the connection portions 115 are greatly reduced and the energy of detection vibrations does not escape from the central base 102. In addition, even if the support substrate (external structure) to which the central base 102 is fixed deforms or vibrates as a result of receiving a stress, a vibration of the 3rd detection vibration mode is not generated in the vibrating body 101 due to the effect of such a deformation or vibration. Therefore, the detection sensitivity and detection accuracy are further improved and generation of variations in characteristics is significantly reduced or prevented. Thus, in the 3rd detection vibration mode, only the internal connection beams 105A to 105D undergo detection vibration in the planar surface (X-Y plane) and the detection vibrations are detecting by detecting the vibrations of the internal connection beams 105A to 105D using detection elements, which will be described later.

Next, description will be given of a configuration in which the vibrating body 101 is provided with piezoelectric elements as driving elements and detection elements in the angular velocity detection element 100 according to the 3rd preferred embodiment. Electrostatic force or electrostatic capacitance may be used as driving elements and detection elements instead of piezoelectric elements, for example.

Figure 15:
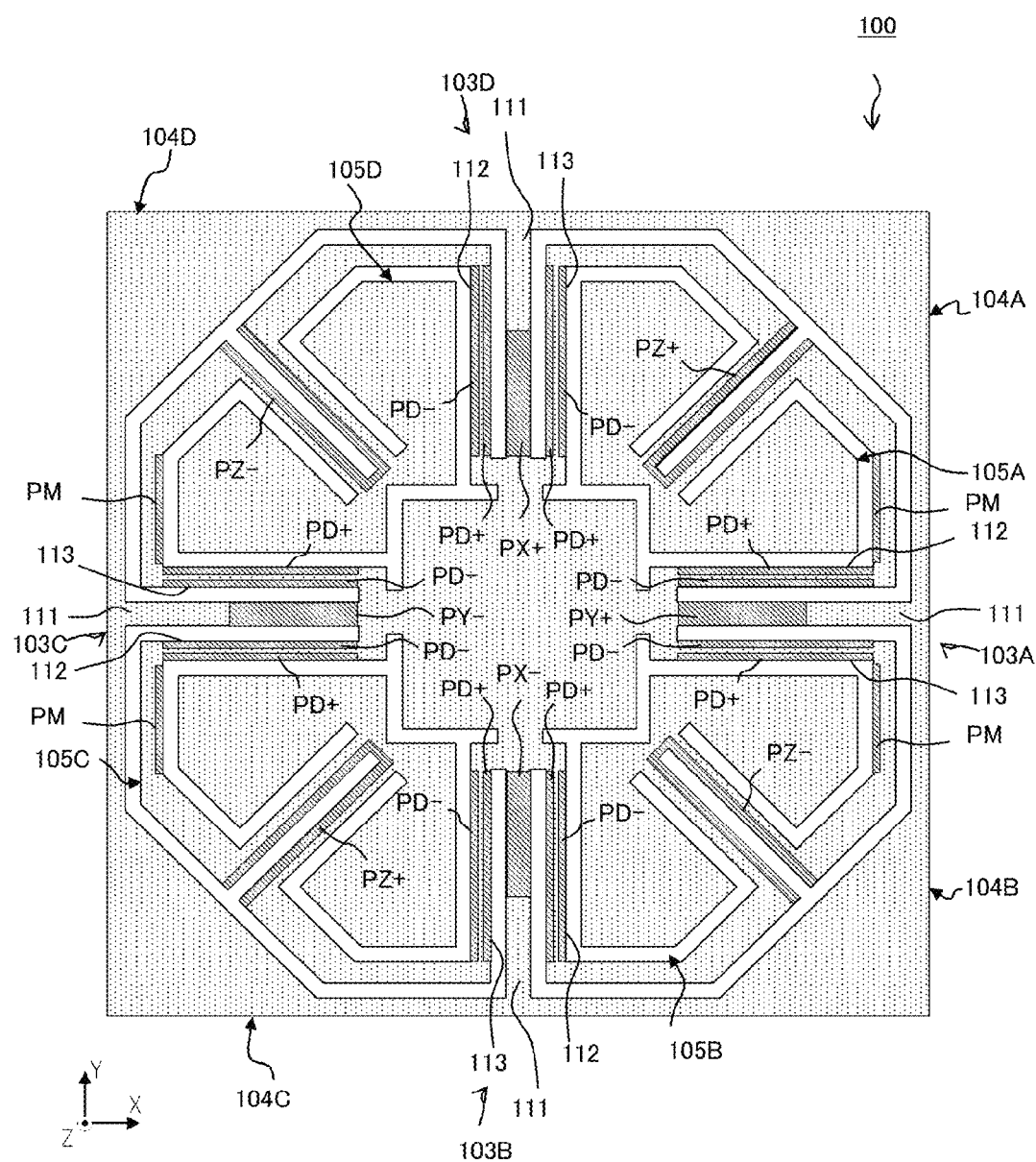
FIG. 15 illustrates piezoelectric elements of the angular velocity detection element according to the 3rd preferred embodiment of the present invention.
Figure 16A:
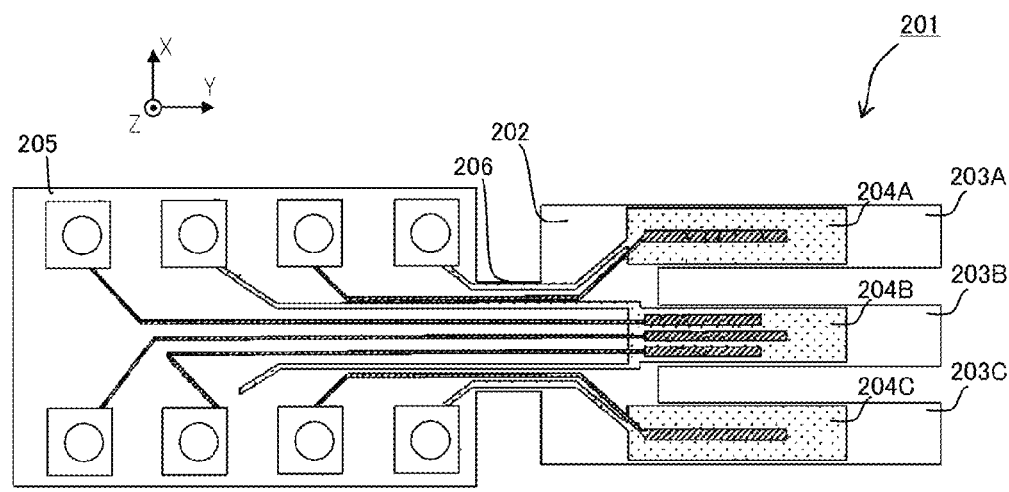
FIGS. 16A and 16B illustrate angular velocity detection elements according to examples of the related art.
Figure 16B:
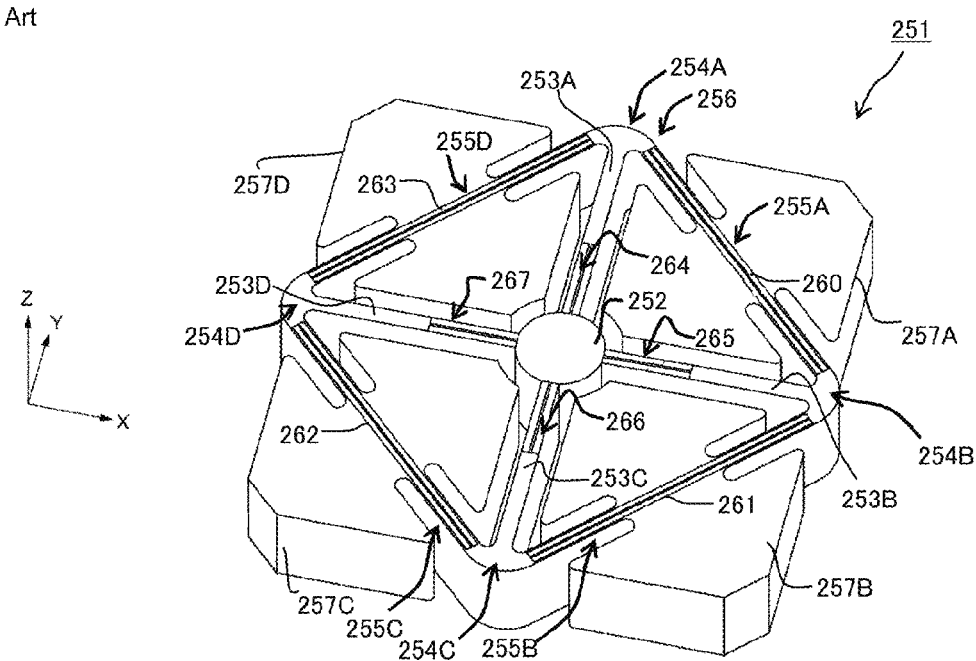

FIG. 15 is an X-Y plane plan view of the angular velocity detection element 100.

The angular velocity detection element 100 includes detection piezoelectric elements PX+, PX−, PY+, PY−, PZ+ and PZ−, driving piezoelectric elements PD+ and PD− and monitor piezoelectric elements PM.

More specifically, a driving piezoelectric element PD+ and a driving piezoelectric element PD− are provided as a set to each left detection beam 112 and right detection beam 113 of the detection beams 103A to 103D. The driving piezoelectric element PD+ and the driving piezoelectric element PD− are arranged side by side so as to extend in the radial direction on the left detection beam 112 and the right detection beam 113. In the detection beams 103A and 103C, the driving piezoelectric elements PD− are arranged on the inside and the driving piezoelectric elements PD+ are arranged on the outside in the direction in which the left detection beam 112 and the right detection beam 113 are arranged side by side. In the detection beams 103B and 103D, the driving piezoelectric elements PD+ are arranged on the inside and the driving piezoelectric elements PD− are arranged on the outside in direction in which the left detection beam 112 and the right detection beam 113 are arranged side by side.

The driving piezoelectric elements PD+ and the driving piezoelectric elements PD− are applied with alternating current voltages set with opposite phases. Thus, a vibration of the driven vibration mode illustrated in FIG. 13 is generated in the vibrating body 101.

The arrangement of the driving piezoelectric elements PD+ and PD− illustrated here is just an example and the arrangement of the driving piezoelectric elements PD+ and PD− may be any arrangement so long as the arrangement can cause a vibration of the driven vibration mode illustrated in FIG. 13 to be generated.

The detection piezoelectric elements PX+, PX−, PY+, PY−, PZ+ and PZ− are provided on the detection beams 103A to 103D and the internal connection beams 105A to 105D and are connected to a detection circuit (differential amplifier circuit) via wiring electrodes and land electrodes, which are not illustrated.

The detection piezoelectric element PX+ and the detection piezoelectric element PX− are configured to detect an angular velocity acting around the X axis. The detection piezoelectric element PX+ is provided on the central detection beam 111 of the detection beam 103D. The detection piezoelectric element PX− is provided on the central detection beam 111 of the detection beam 103B.

The detection piezoelectric element PY+ and the detection piezoelectric element PY− are configured to detect an angular velocity acting around the Y axis. The detection piezoelectric element PY+ is provided on the central detection beam 111 of the detection beam 103A. The detection piezoelectric element PY− is provided on the central detection beam 111 of the detection beam 103C.

The detection piezoelectric elements PZ+ and the detection piezoelectric elements PZ− are configured to detect an angular velocity acting around the Z axis. The detection piezoelectric elements PZ+ is provided so as to extend from the connection beam 131A2 to the connection beam 133A2 of the internal connection beam 105A and from the connection beam 131C2 to the connection beam 133C2 of the internal connection beam 105C. The detection piezoelectric elements PZ− are provided so as to extend from the connection beam 131B2 to the connection beam 133B2 of the internal connection beam 105B and from the connection beam 131D2 to the connection beam 133D2 of the internal connection beam 105D.

In the 1st detection vibration mode generated by an angular velocity acting around the X axis, when the external connection beam 104D and the external connection beam 104A are displaced in the positive direction along the Z axis and the external connection beam 104B and the external connection beam 104C are displaced in the negative direction along the Z axis, the detection piezoelectric element PX+ contracts and the detection piezoelectric element PX− extends. Conversely, when the external connection beam 104D and the external connection beam 104A are displaced in the negative direction along the Z axis and the external connection beam 104B and the external connection beam 104C are displaced in the positive direction along the Z axis, the detection piezoelectric element PX+ extends and the detection piezoelectric element PX− contracts. Thus, voltages of opposite polarities are generated in the detection piezoelectric element PX+ and the detection piezoelectric element PX−.

In the 2nd detection vibration mode generated by an angular velocity acting around the Y axis, only the detection beams 103D and 103B are deformed so as to be twisted and a change in voltage is not generated in the detection piezoelectric elements PX+ and PX−. In addition, in the 3rd detection vibration mode generated by an angular velocity acting around the Z axis, an extension region and a contraction region are provided in the detection piezoelectric elements PX+ and PX− and a change in voltage is not generated in the detection piezoelectric elements PX+ and PX−.

Therefore, by subjecting the voltage of the detection piezoelectric elements PX+ and the voltage of the detection piezoelectric element PX− to differential amplification, the angular velocity around the X axis is detected without detecting the angular velocity around the Y axis and the angular velocity around the Z axis.

In addition, in the 2nd detection vibration mode generated by an angular velocity acting around the Y axis, when the external connection beam 104A and the external connection beam 104B are displaced in the positive direction along the Z axis and the external connection beam 104C and the external connection beam 104D are displaced in the negative direction along the Z axis, the detection piezoelectric element PY+ contracts and the detection piezoelectric element PY− extends. Conversely, when the external connection beam 104A and the external connection beam 104B are displaced in the negative direction along the Z axis and the external connection beam 104C and the external connection beam 104D are displaced in the positive direction along the Z axis, the detection piezoelectric element PY+ extends and the detection piezoelectric element PY−contracts. Thus, voltages of opposite polarities are generated in the detection piezoelectric element PY+ and the detection piezoelectric element PY−.

In the 1st detection vibration mode generated by an angular velocity acting around the X axis, only the detection beams 103A and 103C are deformed so as to be twisted and a change in voltage is not generated in the detection piezoelectric elements PY+ and PY−. In addition, in the 3rd detection vibration mode generated by an angular velocity acting around the Z axis, an extension region and a contraction region are provided in the detection piezoelectric elements PY+ and PY− and a change in voltage is not generated in the detection piezoelectric elements PY+ and PY−.

Therefore, by subjecting the voltage of the detection piezoelectric element PY+ and the voltage of the detection piezoelectric element PY− to differential amplification, the angular velocity around the Y axis is detected without detecting the angular velocity around the X axis and the angular velocity around the Z axis.

In addition, in the 3rd detection vibration mode generated by an angular velocity acting around the Z axis, the detection piezoelectric elements PZ− contract when the detection piezoelectric elements PZ+ extend and the detection piezoelectric element PZ− extend when the detection piezoelectric elements PZ+ contract and voltages of opposite polarities are generated in the detection piezoelectric elements PZ+ and the detection piezoelectric elements PZ−.

On the other hand, in the 1st detection vibration mode and the 2nd detection vibration mode, voltages of opposite polarities are generated in detection piezoelectric elements provided in one region and another region between which the axis around which the angular velocity acts is interposed in each pair of detection piezoelectric elements PZ+ and PZ−. Therefore, if the voltage at an electrode to which the detection piezoelectric elements PZ+ are connected and the voltage at an electrode to which the detection piezoelectric elements PZ− are connected are subjected to differential amplification, an angular velocity around the Z axis is detected without detecting an angular velocity around the X axis and an angular velocity around the Y axis.

The angular velocity detection element 100 according to the 3rd preferred embodiment of the present invention is configured as described above and is capable of separately detecting angular velocities around three axes of an orthogonal coordinates system. A detection vibration of the vibrating body 101 is detected without detecting a driven vibration of the vibrating body 101 for angular velocities around the X axis and the Y axis and generation of an unwanted detection signal is prevented. In addition, driven vibrations and detection vibrations of the vibrating body 101 are confined to the external connection beams 104A to 104D, the internal connection beams 105A to 105D and the detection beams 103A to 103D and do not escape to the support substrate via the central base 102. Therefore, the vibration efficiencies of driven vibration and detection vibration are high and high detection sensitivity and detection accuracy are realized. In addition, the effect of stress and vibration acting on the support substrate is not transmitted to the driven vibration and the detection vibration and as a result of this as well high detection sensitivity and detection accuracy are realized, and an angular velocity detection element 100 having little variation in characteristics is provided.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An angular velocity detection element comprising:
a vibrating body configured to detect an angular velocity based on a detection vibration generated by an action of a Coriolis force in the vibrating body that undergoes driven vibration along a planar surface, the vibrating body including:
a central base fixed in a center of the planar surface;
four detection beams extending in radial directions from the central base at equal or substantially equal angular intervals at the planar surface;
four internal connection beams connected between the four adjacent detection beams and including weights attached thereto; and
four external connection beams connected between the four adjacent detection beams, including weights attached thereto and arranged farther toward the outside in the radial direction than the internal connection beams;
wherein the four detection beams each include a base end detection beam that is connected to the central base at an end portion of the base end detection beam on an inside in the radial direction; a central detection beam that is connected to the base end detection beam at an end portion of the central detection beam on the inside in the radial direction and is connected at an end portion of the central detection beam on the outside in the radial direction to one of the external connection beams on a first side of the central detection beam and is connected to another one of the external connection beams on a second side of the central detection beam; a first direction which is orthogonal to the radial direction and a second direction opposite to the 1st direction; a 1st-direction-side detection beam that is connected to the base end detection beam at an end portion of the 1st-direction-side detection beam on the inside in the radial direction and is connected to one of the internal connection beams at an end portion of the 1st-direction-side detection beam on the outside in the radial direction; and a 2nd-direction-side detection beam that is connected to the base end detection beam at an end portion of the 2nd-direction-side detection beam on the inside in the radial direction and is connected to another one of the internal connection beams at an end portion of the 2nd-direction-side detection beam on the outside in the radial direction; wherein the 1st-direction-side detection beam, the 2nd-direction-side detection beam, and the central detection beam are each parallel to one another.

2. The angular velocity detection element according to claim 1, wherein the weights of the one of the four external connection beams and one of the four internal connection beam that undergoes driven vibration are displaced with a same phase in the radial direction.

3. The angular velocity detection element according to claim 2, wherein the detection vibration of the vibrating body is detected based on a detection vibration of the another of the four external connection beams and another of the four internal connection beams, which is static in a driven vibration.

4. The angular velocity detection element according to claim 3, wherein the detection vibration of the vibrating body is detected such that the external connection beams and the internal connection beams are displaced in directions orthogonal or substantially orthogonal to the planar surface in opposite directions to each other.

5. The angular velocity detection element according to claim 3, wherein the detection vibration of the vibrating body is detected such that the external connection beams and the internal connection beams rotate around an axis orthogonal or substantially orthogonal to the planar surface in opposite directions to each other.

6. The angular velocity detection element according to claim 4, wherein the detection vibration of the vibrating body is detected such that the external connection beams and the internal connection beams rotate around an axis orthogonal or substantially orthogonal to the planar surface in opposite directions to each other.

7. The angular velocity detection element according to claim 1, wherein each pair of weights adjacent to each other with a detection beam therebetween of the one of the four external connection beams and one of the four internal connection beams that undergoes driven vibration rotate in opposite directions to each other around an axis orthogonal or substantially orthogonal to the planar surface.

8. The angular velocity detection element according to claim 7, wherein
the one of the four external connection beams and the one of the four internal connection beams that undergoes driven vibration each include a 1st connection beam that extends in a direction intersecting the radial direction at the planar surface and is connected to the detection beam, a 2nd connection beam that extends in the radial direction at the planar surface and is connected to the 1st connection beam, and a weight that is connected to the 2nd connection beam.

9. The angular velocity detection element according to claim 1, further comprising a driving piezoelectric element that causes the vibrating body to undergo driven vibration and a detection piezoelectric element that detects a detection vibration of the vibrating body.

10. The angular velocity detection element according to claim 2, further comprising a driving piezoelectric element that causes the vibrating body to undergo driven vibration and a detection piezoelectric element that detects a detection vibration of the vibrating body.

11. The angular velocity detection element according to claim 3, further comprising a driving piezoelectric element that causes the vibrating body to undergo driven vibration and a detection piezoelectric element that detects a detection vibration of the vibrating body.

12. The angular velocity detection element according to claim 4, further comprising a driving piezoelectric element that causes the vibrating body to undergo driven vibration and a detection piezoelectric element that detects a detection vibration of the vibrating body.

13. The angular velocity detection element according to claim 5, further comprising a driving piezoelectric element that causes the vibrating body to undergo driven vibration and a detection piezoelectric element that detects a detection vibration of the vibrating body.

14. The angular velocity detection element according to claim 6, further comprising a driving piezoelectric element that causes the vibrating body to undergo driven vibration and a detection piezoelectric element that detects a detection vibration of the vibrating body.

15. The angular velocity detection element according to claim 7, further comprising a driving piezoelectric element that causes the vibrating body to undergo driven vibration and a detection piezoelectric element that detects a detection vibration of the vibrating body.

16. The angular velocity detection element according to claim 8, further comprising a driving piezoelectric element that causes the vibrating body to undergo driven vibration and a detection piezoelectric element that detects a detection vibration of the vibrating body.

17. The angular velocity detection element according to claim 1, further comprising a piezoelectric element that detects a driven vibration of the vibrating body in order to control a driving voltage of the driving piezoelectric element.

18. The angular velocity detection element according to claim 2, further comprising a piezoelectric element that detects a driven vibration of the vibrating body in order to control a driving voltage of the driving piezoelectric element.

19. The angular velocity detection element according to claim 1, wherein the vibrating body includes a single substrate.

20. The angular velocity detection element according to claim 10, wherein the substrate is a semiconductor wafer.

* * * * *